(12) United States Patent
Erdmann et al.

(10) Patent No.: US 12,540,212 B2
(45) Date of Patent: Feb. 3, 2026

(54) SYNTHESIS OF POLYURETHANE POLYMERS IN FLOW REACTORS

(71) Applicant: International Business Machines Corporation, Armonk, NY (US)

(72) Inventors: Tim Erdmann, San Jose, CA (US); Nathaniel H. Park, San Jose, CA (US); James L. Hedrick, Pleasanton, CA (US); Pedro Arrechea, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1249 days.

(21) Appl. No.: 17/318,004

(22) Filed: May 12, 2021

(65) Prior Publication Data
US 2022/0380516 A1    Dec. 1, 2022

(51) Int. Cl.
*C08G 18/32* (2006.01)
*B01J 8/02* (2006.01)
*C08G 18/18* (2006.01)
*C08G 18/72* (2006.01)

(52) U.S. Cl.
CPC ........ *C08G 18/3203* (2013.01); *B01J 8/0278* (2013.01); *C08G 18/1858* (2013.01); *C08G 18/72* (2013.01); *B01J 2208/00548* (2013.01)

(58) Field of Classification Search
None
See application file for complete search history.

(56) References Cited

U.S. PATENT DOCUMENTS

| | | | | |
|---|---|---|---|---|
| 4,055,549 | A * | 10/1977 | Roberts | C08G 18/302 528/80 |
| 5,674,921 | A * | 10/1997 | Regula | A61L 31/148 528/80 |
| 8,933,146 | B2 | 1/2015 | Sommer et al. | |
| 10,329,376 | B2 | 6/2019 | Chen et al. | |
| 2002/0058777 | A1 | 5/2002 | Brauer et al. | |
| 2006/0241242 | A1* | 10/2006 | Devlin | C08F 2/04 525/53 |
| 2007/0015842 | A1 | 1/2007 | Moerman et al. | |
| 2008/0226516 | A1 | 9/2008 | Suzuki et al. | |
| 2009/0053530 | A1 | 2/2009 | Sommer et al. | |
| 2013/0023599 | A1 | 1/2013 | Hsiao et al. | |
| 2014/0323638 | A1* | 10/2014 | Zhang | C08G 18/10 524/507 |
| 2016/0299063 | A1* | 10/2016 | Ebisawa | G01N 21/359 |
| 2017/0096520 | A1 | 4/2017 | Chen et al. | |
| 2018/0312437 | A1 | 11/2018 | Cao et al. | |
| 2020/0010610 | A1* | 1/2020 | Park | B01J 19/243 |
| 2020/0407496 | A1 | 12/2020 | Park et al. | |

FOREIGN PATENT DOCUMENTS

| | | |
|---|---|---|
| CN | 101696271 B | 10/2011 |
| CN | 105037793 A | 11/2015 |
| CN | 103936959 B | 3/2017 |
| CN | 104530378 B | 7/2017 |
| CN | 104629046 B | 8/2017 |
| CN | 108164669 A | 6/2018 |
| CN | 109575192 B | 9/2020 |
| CN | 111704714 A | 9/2020 |
| JP | 2000-500060 A | 1/2000 |
| JP | 2008-221095 A | 9/2008 |
| JP | 2011-046863 A | 3/2011 |
| JP | 2020-045458 A | 3/2020 |
| JP | 2024-518223 A | 5/2024 |
| WO | 1996/041822 A1 | 12/1996 |
| WO | 2022/237492 A1 | 11/2022 |

OTHER PUBLICATIONS

Nadjiadjim, et al., "Development and Monitoring of a Continuous Polyurethane Pilot Reactor," revised: Sep. 9, 2010; accepted: Sep. 13, 2010, DOI: 10.1002/ceat.201000296, © 2010 Wiley-VCH Verlag Gmbh & Co. KGaA, Weinheim Chem. Eng. Technol. 2010, 33, No. 11, pp. 1900-1908.

Nadjiadjim, et al., "Development and Monitoring of a Continuous Polyurethane Pilot Reactor," First published: Oct. 5, 2010, https://doi.org/10.1002/ceat.201000296, abstract 3 pages.

prnewswire.com, "Global Polyurethane Market Report 2017—Should Reach $68 Billion by 2021 from $49.8 Billion in 2016—Research and Markets," Jun. 22, 2017, 5 pages.

plasticsinsight.com, "Polyurethane Production, Pricing and Market Demand Polyurethane Properties, Production, Price, Market, and Uses," https://www.plasticsinsight.com/resin-intelligence/resin-prices/polyurethane/, Retrieved from the Internet: Feb. 22, 2021, 31 pages.

essentialchemicalindustry.org, "Polyurethanes," https://www.essentialchemicalindustry.org/polymers/polyurethane.html, Date last amended: Apr. 24, 2017, Retrieved from the Internet: Feb. 22, 2021, 12 pages.

Lima et al., "New Polymerization Processes", Handbook of Polymer Synthesis, Characterization, and Processing, 2013, pp. 317-334.

Yoshida et al., "Basics of Flow Microreactor Synthesis", SpringerBriefs in Molecular Science, DOI 10.1007/978-4-431-55513-1, 2015, 111 pages.

Bragheri et al., "Microfluidics", Three-Dimensional Microfabrication Using Two-Photon Polymerization, 2016, pp. 310-334.

Bally et al.,"Homogeneous Polymerization: Benefits Brought by Microprocess Technologies to the Synthesis and Production of Polymers", Macromolecular Reaction Engineering, DOI: 10.1002/mren.201000006, 2010, pp. 543-561.

Gutmann et al., "Continuous-Flow Technology—A Tool for the Safe Manufacturing of Active Pharmaceutical Ingredients", Angewandte Chemistry, DOI: 10.1002/anie.201409318, vol. 54, 2015, pp. 6688-6728.

(Continued)

*Primary Examiner* — Christopher M Rodd
(74) *Attorney, Agent, or Firm* — Amin, Turocy & Watson, LLP

(57) ABSTRACT

Techniques regarding the polymerization of polyurethanes are provided. For example, one or more embodiments described herein can comprise synthesizing, via a polymerization reaction performed within a flow reactor, a polyurethane. The polymerization reaction can polymerize a diol with a diisocyanate.

14 Claims, 12 Drawing Sheets

(56) References Cited

OTHER PUBLICATIONS

Junkers, Thomas, "Precision Polymer Design in Microstructured Flow Reactors: Improved Control and First Upscale at Once", Macromolecular Chemistry and Physics, DOI: 10.1002/macp.201600421, 2016, 09 pages.

Britton et al., "Multi-step continuous-flow synthesis", School of Chemical and Physical Sciences, DOI: 10.1039/c6cs00830e, Jan. 20, 2017, 22 pages.

Wegner et al., "Ten key issues in modern flow chemistry", Chem. Communication, vol. 47, DOI: 10.1039/c0cc05060a, 2011, vol. 47, pp. 4583-4592.

Lévesque et al., "Advancing Flow Chemistry Portability: A Simplified Approach to Scaling Up Flow Chemistry", American Chemical Society, DOI: 10.1021/acs.oprd.8b00063, Jun. 27, 2018, 07 pages.

Plutschack et al., "The Hitchhiker's Guide to Flow Chemistry", Chemical Reviews, DOI: 10.1021/acs.chemrev.7b00183, vol. 117, 2017, pp. 11796-11893.

Baumann et al., "The synthesis of active pharmaceutical ingredients (APIs) using continuous flow chemistry", Beilstein Journal of organic Chemistry, 2015, pp. 1194-1219.

Zaquen et al., "Polymer Synthesis in Continuous Flow Reactors", Progress in Polymer Science, URL: https://doi.org/10.1016/j.progpolymsci.2020.101256, 2020, 40 pages.

Reis et al.,Polymerizations in Continuous Flow: Recent Advances in the Synthesis of Diverse Polymeric Materials, ACS Macro Letters, URL: https://dx.doi.org/10.1021/acsmacrolett.9b00933, vol. 107, 2020, pp. 123-133.

Hu et al., "Continuous flow ring-opening polymerizations", Reaction Chemistry & Engineering, DOI: 10.1039/C6RE00206D, 2013, 06 pages.

Junkers, Tanja., "Precise Macromolecular Engineering via Continuous-Flow Synthesis Techniques", Polymer Reaction Design Group, Institute for Materials Research (IMO), Oct. 15, 2017, pp. 106-110.

Su et al.,"Continuous-Flow Microreactors for Polymer Synthesis: Engineering Principles and Applications", URL: https://doi.org/10.1007/s41061-018-0224-1, Nov. 19, 2018, 44 pages.

Buss et al., Photoinduced Controlled Radical Polymerizations Performed in Flow: Methods, Products, and Opportunities, Chemistry of Materials, vol. 30, DOI: 10.1021/acs.chemmater.8b01359, vol. 30, 2018, pp. 3931-3942.

Chan et al., "Copper-Mediated Controlled Radical Polymerization in Continuous Flow Processes: Synergy between Polymer Reaction Engineering and Innovative Chemistry", Journal of Polymer Science, 2013, 16 pages.

Hu et al., "Continuous flow copper-mediated reversible deactivation radical polymerizations", European Polymer Journel, URL: http://dx.doi.org/10.1016/j.eurpolymj.2016.04.006, Jan. 3, 2016, 13 pages.

Derboven et al., "Improved Livingness and Control over Branching in RAFT Polymerization of Acrylates: Could Microfl ow Synthesis Make the Difference?", Macromolecular Rapid Communications, DOI: 10.1002/marc.201500357, vol. 36, 2015, pp. 2149-2155.

Judzewitsch et al., "High-Throughput Process for the Discovery of Antimicrobial Polymers and Their Upscaled Production via Flow Polymerization", Macromolecules URL: https://dx.doi.org/10.1021/acs.macromol.9b02207, Oct. 18, 2019, 09 pages.

Vrijsen et al., "Continuous Flow Synthesis of Core Cross-Linked Star Polymers via Photo-Induced Copper Mediated Polymerization", Polymer Chemistry, DOI: 10.1039/x0xx00000x, 2019, 09 Pages.

Tohnauser et al., "Microflow Technology in Polymer Synthesis", Macromolecules, DOI: doi.org/10.1021/ma301671x, vol. 45, 2012, 20 pages.

Wilms et al., "Synthesis of Hyperbranched Polyglycerol in a Continuous Flow Microreactor", Chem. Eng. Technol, vol. 30 No. 30, DOI: 10.1002/ceat.200700277, vol. 30, No. 11, Jul. 26, 2007, pp. 1519-1524.

Lin et al., "Ultrafast and Controlled Ring-Opening Polymerization with Sterically Hindered Strong Bases", Macromolecules, DOI: https://dx.doi.org/10.1021/acs.macromol.0c01571, vol. 53, Jul. 7, 2020, 08 Pages.

Lin et al.,"Programmable High-Throughput Platform for the Rapid and Scalable Synthesis of Polyester and Polycarbonate Libraries", American Chemical Society, DOI: 10.1021/jacs.9b02450, vol. 141, May 22, 2019, pp. 8921-8927.

Walsh et al., "General route to design polymer molecular weight distributions through flow chemistry", Nature Communications, DOI 10.1038/s41467-020-16874-6, 2020, 09 pages.

Pirotte et al., "Continuous Flow Polymer Synthesis toward Reproducible Large-Scale Production for Efficient Bulk Heterojunction Organic Solar Cells", Chemsuschem, DOI : 10.1002/cssc.201500850, 2015, vol. 8, pp. 3328-3233.

Singh et al., "High-Throughput Template-Free Continuous Flow Synthesis of Polyaniline Nanofibers", Ind. Eng. Chem. Res., Just Accepted Manuscript, DOI: 10.1021/acs.iecr.8b04507, Dec. 5, 2018, 33 pages.

Pirotte et al., "Molecular weight tuning of low bandgap polymers by continuous flow chemistry: increasing the applicability of PffBT4T for organic photovoltaics", Journal of Materials Chemistry A, Aug. 8, 2017, 20 pages.

Seyler et al., "Continuous flow synthesis of conjugated polymers", Chem. Commun, DOI: 10.1039/c1cc14315h, vol. 48, 2012, pp. 1598-1600.

Kessler et al., "Synthesis of Defined Poly(silsesquioxane)s:Fast Polycondensation of Trialkoxysilanes in a Continuous-Flow Microreactor", Macromolecular Chemistry and physics, DOI: 10.1002/macp.200800611, vol. 210, 2009, pp. 807-813.

Krol, Piotr., "Synthesis Methods, Chemical Structures, Properties and Applications", Linear Polyurethanes, ISBN 978 90 04 16124 5, 2008, 275 pages.

Lonescu, Mihail, Chemistry and Technology of Polyols for Polyurethanes, Rapra Technology Limited vol. 2, 2005, 605 pages.

Jiang et al., "Synthesis and structure/properties characterizations of four polyurethane model hard segments", Royal Society of open Science, URL: http://dx.doi.org/10.1098/rsos.180536, vol. 5, May 17, 2021, 11 pages.

Miller et al., "Properties of Polyether-Polyurethane Block Copolymers: Effects of Hard Segment Length Distribution", Macromolecules vol. 18, No. 1, 1985, pp. 32-44.

Zdrahala et al., "Polyether-Based Thermoplastic Polyurethanes. I. Effect of the Hard-Segment Content", Journal of Applied Polymer Science, vol. 24, 1979, pp. 2041-2050.

Sharmin et al., "Polyurethane: An Introduction", DOI 10.5772/51663, 2012, 14 pages.

Lin et al., "Urea Anions: Simple, Fast, and Selective Catalysts for Ring-Opening Polymerizations", Journal of the American Chemical Society, DOI: 10.1021/jacs.6b11864, Jan. 20, 2017, pp. 1645-1652.

Harell et al., "Using H Nmr Spectra of Polymers and Polymer Products To Illustrate Concepts in Organic Chemistry", Journal of Chemical Education, DOI: 10.1021/acs.jchemed.6b00801, 2017, 06 pages.

Koltzenburg et al., "Polymer Chemistry", Springer Berlin Heidelberg, 2017, 1 of 2.

Odian George, "Principles of Polymerization", Fourth Edition, John Wiley & Sons, Inc., Publication, 2004, 839 pages.

Koltzenburg et al., "Polymer Chemistry", Springer Berlin Heidelberg, 2017, 2 of 2.

International Search Report and Written Opinion received for International PCT Application Serial No. PCT/CN2022/088194 dated Jul. 20, 2022, 9 pages.

Japan Patent Office, "Notice of Reasons for Refusal" Jun. 18, 2025, 10 Pages, JP Application No. 2023-553570.

* cited by examiner

SYNTHESIS OF POLYURETHANE POLYMERS IN FLOW REACTORS

BACKGROUND

The subject disclosure relates to the synthesis of polyurethane polymers via one or more flow reactors, and more specifically, to polyurethane polymerization schemes that can be autonomously performed via one or more computer-controlled flow reactors.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, polymer syntheses, computer-implemented methods, systems, and/or computer program products that can regard the synthesis of polyurethanes via one or more flow reactors are described.

According to an embodiment, a method is provided. The method can comprise synthesizing, via a polymerization reaction performed within a flow reactor, a polyurethane. The polymerization reaction polymerizes a diol with a diisocyanate.

According to an embodiment, a computer-implemented method is provided. The computer-implemented method can comprise measuring, by a system operatively coupled to a processor, a reactant conversion of a polyurethane polymerization reaction within a flow reactor. Also, the computer-implemented method can comprise adjusting, by the system, a flow rate of a chemical reactant within the flow reactor based on the measuring to achieve a target polyurethane structure.

According to an embodiment, a system is provided. The system can comprise a flow reactor that can house a polyurethane polymerization reaction. The system can further comprise a measurement device that can determine a reactant conversion value of the polyurethane polymerization reaction within the flow reactor. Additionally, the system can comprise a computing device that controls the polyurethane polymerization reaction based on the reactant conversion value by adjusting a flow rate within the flow reactor.

DETAILED DESCRIPTION

Figure 1:
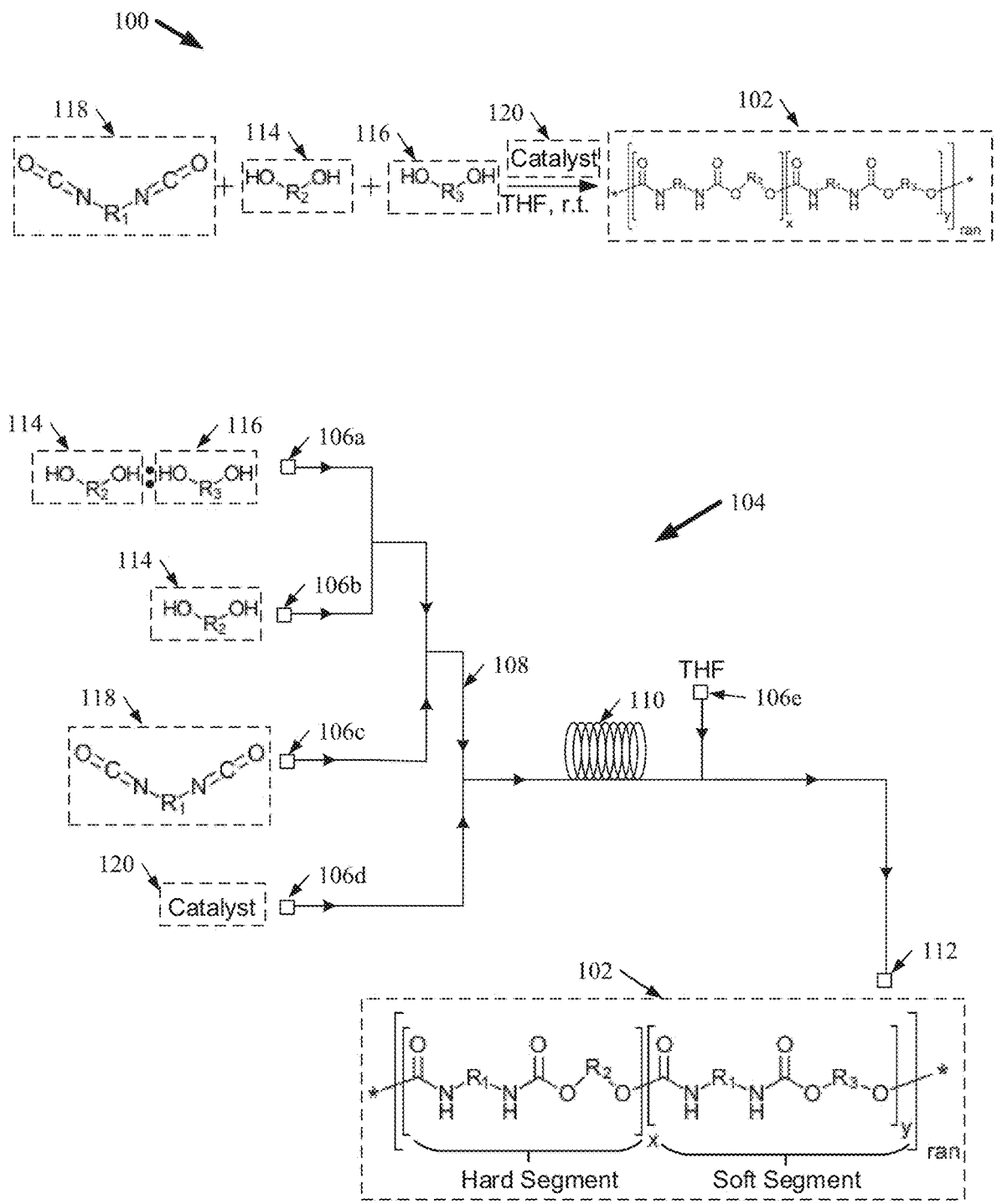
FIG. 1 illustrates a diagram of an example, non-limiting polymerization scheme for the synthesis of polyurethane within one or more flow reactors in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The synthesis of polyurethanes via step-growth polymerization can allow material properties of the polymers to be tailored to a desired application through the choice of starting materials, compositions, and/or post-processing. However, stoichiometric imbalances, the high reactive nature of the isocyanate group, and/or the exothermic polymerization process can cause batch-to-batch variations and secondary reactions decreasing the control over the polymerization, material quality, molecular weight characteristics, and reproducibility.

Various embodiments described herein regard the utilization of flow reactors for the synthesis of polyurethanes. Further, one or more embodiments described herein can employ the integration of in-line analytics and/or real-time process control mechanisms with the flow reactors. For example, one or more embodiments described herein can include the synthesis of segmented linear polyurethanes, which can include a composition of hard segments and soft segments distributed along a polymer backbone. The hard segments can originate from low molecular weight monomers (e.g., diisocyanate monomers and/or diol monomers) to generate urethane groups. Due to the resulting short intramolecular distance between urethane moieties along the polymer backbone, together with their ability for intermolecular hydrogen bonding, relatively strong interactions can enable the formation of crystalline domains. The soft segments can originate from higher molecular weight diol (e.g., polymeric diols with glass transition temperatures below ambient levels). Further, the soft segments can be amorphous and integrated into the polymer backbone. In various embodiments, 4,4'-methylene diphenyl diisocyanate ("MDI") can be employed as the diisocyanate monomer. Also, as diol counterparts, low molecular weight 1,6-hexanediol ("HDO") and polymeric diols based on polyethylene glycol ("PEG") and polycaprolactone can be employed. One or more embodiments can further employ an organic and/or organometallic catalyst (e.g., dibutyltin dilaurate ("DBTDL") and/or 1,8-diazabiciclo[5.4.0]undeca-7-ene ("DBU")) to facilitate the polymerizations.

In one or more embodiments, the polyurethane polymerizations can be conducted within one or more flow reactors. As used herein, the term "flow reactor" can refer to a device in which one or more chemical reactions can take place within one or more channels (e.g., microfluidic channels), such as tubing with an inner diameter of 0.1 to 1 millimeters (mm). For example, a flow reactor can facilitate continuous flow production, as opposed to batch production. One or more streams of chemical reactants can flow (e.g., continuously) through the one or more channels of the flow reactor, wherein one or more chemical reactions (e.g., polymerizations, protonations, and/or deprotonations) involving the chemical reactants can occur within the one or more channels as the one or more streams flow. In various embodiments, the polymerizations described herein can be performed in one or more flow reactors at room temperature, or an elevated temperature, with residence times ranging from, for example, milliseconds (e.g., with highly active catalysts and/or elevated temperatures) to minutes; and flow rates ranging from, for example, greater than or equal to 1 microliters per minute ($\mu$L/min) and less than or equal to 100 milliliters per second (mL/s).

In one or more embodiments, the one or more flow reactors employed to conduct the polyurethane syntheses can include one or more sensors, measurement devices, and/or proportional-integral-derivative ("PID") controllers. Further, the one or more flow reactors can be coupled to one or more reactor control systems. In various embodiments, the one or more reactor control systems can autonomously control the one or more flow reactors to synthesize a target polyurethane. For example, the one or more reactor control systems can control the amount and/or concentration of chemical reactants and/or catalysts introduced into the one or more flow reactors by adjusting one or more flow rates. Additionally, the one or more reactor control systems can monitor the structure and/or characteristics of polymers resulting from active synthesis conditions. Thereby, the one or more reactor control systems can control the subsequent introduction of chemical reactants and/or catalysts into the one or more flow reactors based on the monitoring. Thus, the one or more reactor control systems can alter reaction conditions within the one or more flow reactors such that characteristics of the resulting polymers correlate to the polymer targeted for synthesis. In various embodiments, the one or more reactor control systems can employ one or more computer models to determine how the reaction conditions can be altered.

In various embodiments, the chemicals described herein can be acquired from Sigma-Aldrich and used as received unless otherwise specified. For example, MDI can be prepared by sublimating the MDI at 120 degrees Celsius (° C.) under reduced pressure, and the obtained white crystalline solid can be stored in a nitrogen gas ($N_2$) filled glovebox. Macro diols (e.g., polyethylene glycol ("PEG") with a molecular weight ("$M_n$") of 1500 grams per mole (g/mol) ("PEG1500"), PEG having a $M_n$ of 2000 g/mol ("PEG2000"), and polycaprolactone diol ("PCL") having a $M_n$ of 2000 g/mol ("PCL2000")) can be dried by azeotropic vacuum distillation using anhydrous toluene three times and stored in a $N_2$-filled glovebox. In preparing HDO, the HDO can be stored first under vacuum at 40° C. overnight to remove water traces and, afterwards, in a $N_2$-filled glovebox. 1,8-Octanediol can be sublimed under reduced pressure at 65-70° C. 2-Hydroxyethyl methacrylate ("HEMA") can be used without further purification. ε-Caprolactone (ε-CL) can be distilled under reduced pressure and stored with activated molecular sieves in a $N_2$-filled glovebox. DBU can be distilled under reduced pressure and stored in a $N_2$-filled glovebox. DBTDL, 1,5,7-triazabicyclo[4.4.0]dec-5-ene ("TBD"), yttrium (III) isopropoxide oxide ("YIPO"), and azobisisobutyronitrile ("AIBN") can be used without further purification. Anhydrous tetrahydrofuran ("THF") can be stored with activated molecular sieves in a $N_2$-filled glovebox.

The hydrogen-1 nuclear magnetic resonance ("$^1$H NMR") data described herein was collected at 400 megahertz (MHz) using a Bruker Avance 400. Spectrometer at 20° C. with chemical shifts reported in parts-per-million (ppm). The spectra were referenced to the signal of the residual non-deuterated species of the used solvent: chloroform-d ($CDCl_3$: $\delta(^1H)$=7.26 ppm), dimethylsulfoxide-$d_6$ (($CD_3$)$_2$SO: $\delta(^1H)$=2.50 ppm). The attenuated total reflection infrared spectrometry ("ATR-FTIR") data described herein was performed using a Nicolet iS 5 FTIR Spectrometer at a resolution of 2 $cm^{-1}$ with a total of 12 to 64 interferograms averaged. In-line FTIR spectra were recorded by coupling a Golden Gate Micro-Flow Cell Anvil to the spectrometer. The molecular weight characteristics described herein were analyzed by gel permeation chromatography ("GPC") on an Agilent apparatus. The measurements can be conducted using THF as eluent at 25° C. and at a flow rate of 0.75 milliliters per minute (mL/min). The results were analyzed according to a calibration by polystyrene standards. Chromatographs of polyurethane products were only recorded for monomer conversions of 90% or higher. Additionally, in various embodiments described herein, differential scanning calorimetry ("DSC") was performed on a DSC Q2000 or on a DSC8500. Samples can be enclosed in aluminum pans and measurements carried out under $N_2$ atmosphere using a heating rate of 20° C./min or 5° C./min and a temperature range from −70° C. to 150° C. or −75° C. to 110° C., respectively.

FIG. 1 illustrates a diagram of an example, non-limiting polymerization scheme 100 that can facilitate the synthesis of one or more polyurethanes 102 within one or more flow reactors 104 in accordance with one or more embodiments described herein. Repetitive description of like elements employed in other embodiments described herein is omitted for sake of brevity. The one or more flow reactors 104 can comprise, for example, one or more inlets 106, channels 108, reactor loops 110, and/or outlets 112. The one or more channels 108 can extend from the one or more inlets 106 to the one or more outlets 112. The one or more channels 108 (e.g., microfluidic channels) can comprise, for example: tubes (e.g., microfluidic tubes), pipes, joiners (e.g., T-mixers), a combination thereof, and/or the like. Additionally, the one or more channels 108 can be oriented into one or more reactor loops 110 at one or more stages between the one or more inlets 106 and/or outlets 112. The one or more reactor loops 110 can influence the length of the one or more flow reactors 104 and thereby the residence time of the chemical reactions within the one or more flow reactors 104. For example, the length of the one or more flow reactors 104 (including the one or more channels 108 and/or reactor loops 110) can range from, for example, greater than or equal to 1 centimeter (cm) and less than or equal to 1000 cm (e.g., 105 cm). Thereby, the flow rate of chemical reactants streaming within the one or more flow reactors 104 can range from, for example, greater than or equal to 1 μL/min and less than or equal to 100 mL/s (e.g., 0.165 milliliters per minute (mL/min)). Also, the residence time of the chemical reactants within the one or more flow reactors 104 can range from, for example, greater than or equal to 0.1 seconds and less than or equal to 1 hour (e.g., 5 minutes). One of ordinary skill in the art will recognize that the number of loops comprising the reactor loops 110 and/or the dimensions of the loops can vary depending on a desired flow rate, residence time, and/or turbulence. Further, while the reactor loops 110 are depicted in FIG. 1 as characterized by circular shaped structures, the architecture of the reactor loops 110 is not so limited. For example, the one or more reactor loops 110 can be characterized by elliptical and/or polygonal shaped structures.

As shown in FIG. 1, various chemical reactants can be introduced into the flow reactor 104 via respective inlets 106. In various embodiments, a first chemical reactant can be a mixture of a low molecular weight diol 114 and a macro diol 116 introduced into the flow reactor 104 via a first inlet 106a. For example, the low molecular weight diol 114 can have a molecular weight ranging from greater than or equal to 44 g/mol and less than or equal to 1000 g/mol. Also, the macro diol 116 can have a molecular weight ranging from, for example, greater than or equal to 500 g/mol and less than or equal to 5000 grams per mole (kg/mol). In various embodiments, "$R_2$" can be an alkyl chain comprising a number of carbon atoms ranging from, for example, greater than or equal to 1 carbon and less than or equal to 100 carbons. For instance, "$R_2$" can be characterized by the following chemical structure:

($R_2$)

In various examples, HDO can be employed as the low molecular weight diol 114 in accordance with the following chemical structure:

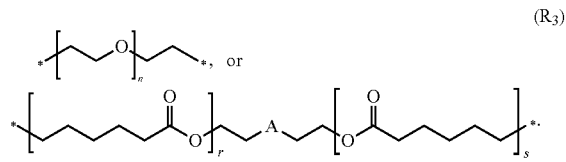

(HDO)

Additionally, "$R_3$" can be characterized by at least one of the following 1 chemical structures:

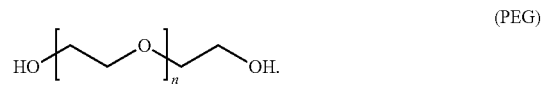

($R_3$)

Where "n" can be an integer ranging from, for example, greater than or equal to 1 and less than or equal to 1000; "r" can be an integer ranging from, for example, greater than or equal to 1 and less than or equal to 1000; and/or "s" can be an integer ranging from, for example, greater than or equal to 1 and less than or equal to 500. Additionally, "A" can represent: a single element, such as oxygen, sulfur, and/or selenium; an alkyl chain (e.g., comprising a number of carbon atoms ranging from, for example, greater than or equal to 1 and less than or equal to 1000); a substituted nitrogen, silicone, phosphor, and/or boron atom; and/or the like. In one or more embodiments, PEG can be employed as the macro diol 116 in accordance with the following chemical structure:

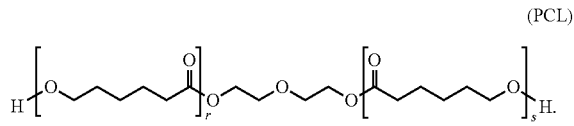

(PEG)

In one or more embodiments, PCL can be employed as the macro diol 116 in accordance with the following chemical structure:

(PCL)

In one or more embodiments, an example of the macro diol 116 can be characterized by the following chemical structure (1):

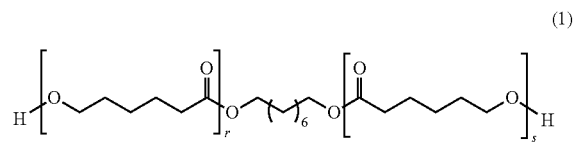

(1)

In various embodiments, the low molecular weight diol 114 and macro diol 116 can be pre-mixed prior to entering the flow reactor 104 (e.g., as shown in FIG. 1). The mixture can comprise a ratio of low molecular weight diol 114 to macro diol 116 ranging from, for example, greater than or equal to 0:100 and less than or equal to 100:0 Additionally, a solution of the low molecular weight diol 114 can be introduced into the flow reactor 104 via a second inlet 106b. In various embodiments, the low molecular weight diol 114 and the macro diol 116 can be introduced into the flow reactor 104 separately. For example, a solution of the macro diol 116 can be introduced into the flow reactor 104 via the first inlet 106a, and a solution of the low molecular weight diol 114 can be introduced into the flow reactor 104 via the second inlet 106b.

Additionally, a diisocyanate monomer 118 can be introduced into the flow reactor 104 via a third inlet 106c. Example types of diisocyanate monomer 118 can include, but are not limited to: MDI, toluene diisocyanate ("TDI"), hexamthylene diisocyanate ("HDI"), isophorone diisocyanate ("IPDI"), a combination thereof, and/or the like. "$R_1$" can be a functional group originating from the diisocyanate monomer 118. For example, when the diisocyanate monomer 118 is MDI, "$R_1$" can be characterized by the following chemical structure:

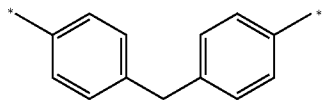

($R_1$)

Moreover, a catalyst 120 can be introduced into the flow reactor 104 via a fourth inlet 106d. In various embodiments, the catalyst 120 can be an organic catalyst and/or an organometallic catalyst. Example catalysts 120 can include, but are not limited to: DBU, DBTDL, TBD, YIPO, 1,4-diazabicyclo[2.2.2]octane ("DABCO"), bismuth octanoate, a combination thereof, and/or the like.

Once introduced into the flow reactor 104, the chemical reactants (e.g., low molecular diol 114, macro diol 116, diisocyanate monomer 118, and/or catalyst 120) can react in the one or more channels 108 and/or reactor loops 110 to synthesize one or more polyurethanes 102. In various embodiments, the reaction time of the polyurethane 102 synthesis can be expressed as residence time ("$\tau$") which is the time each fraction of the reaction mixture needs to pass through the flow reactor 104. The residence time can be determined by the dimensions of the flow reactor 104, and the applied flow rate and can be calculated by Equation 1-3 below.

$$\tau = \frac{V_R}{Q_R} \quad (1)$$

$$\tau = \frac{\frac{\pi}{4} \cdot d_R^2 \cdot l_R}{Q_R} [\text{min}] \quad (2)$$

$$\tau = \frac{15\pi \cdot d_R^2 \cdot l_R}{Q_R} [\text{s}] \quad (3)$$

Where "$V_R$" can be the reactor volume in cubic centimeters (cm³), "$Q_R$" can be the volume flow rate in the flow reactor 104 in cm³·min⁻¹, "$d_R$" can be the inner diameter of the one or more channels 108 in cm, and "$l_R$" can be the length of the one or more channels 108 and reactor loops 110 in centimeters.

Parameters regarding the polyurethane 102 polymerization reaction within the one or more flow reactors 104 can include, but are not limited to: reaction kinetics, residence time, flow reactor 104 dimensions and volume, viscosity of starting solutions and reaction mixture, mixing efficiency, solubility of potential by-products, and potentially changing fluid characteristics with the progressing reaction.

Retention time can be extended by reducing the flow rate at which the chemical reactants (e.g., low molecular diol 114, macro diol 116, diisocyanate monomer 118, and/or catalyst 120) are introduced into the flow reactor 104, and/or by increasing the volume of the flow reactor 104 by increasing the length and/or tubing inner diameter of the channels 108 and/or reactor loops 110. Additionally, higher flow rates and/or smaller flow reactor 104 volumes can be employed if the reactant conversion of the polymerization reaction is higher than desired.

Flow patterns of the chemical reactants (e.g., low molecular diol 114, macro diol 116, diisocyanate monomer 118, and/or catalyst 120) within the flow reactor 104 can be categorized in laminar and turbulent and/or predicted by the Reynolds number ("Re"). At low Re values (e.g., less than 2000) the flow fields of the chemical solutions can be laminar and mixing of the chemical reactants can be dominated by radial diffusion. For fast reactions, high Re values above 5000 can be targeted to ensure a turbulent flow leading to fast efficient mixing of the chemical reactants. With respect to the reaction kinetics, the concentration of the monomers can also be altered within their solubility range to adjust the reaction conversion.

As the chemical reactants react in the flow reactor 104, polyurethane 102 can precipitate within the one or more channels 108. In various embodiments, THF can be introduced into the flow reactor 104 at a point downstream of the one or more reactor loops 110 via a fifth inlet 106e. The THF can re-dissolve the precipitate product, and thereby inhibit clogging of the one or more channels 108. In one or more embodiments, the synthesized polyurethane 102 can exit the flow reactor 104 via one or more outlets 112. For example, the stream of residual chemical reactants and/or polyurethanes 102 can flow out of the one or more outlets 112 and into a collection vessel (not shown). In various embodiments, the collection vessel can be pre-loaded with a quenching solution, such as petroleum ether. The quenching solution can serve to quench the polyurethane 102 polymerization reaction and/or one or more side-reactions. Further, in one or more embodiments, the one or more polyurethanes 102 can be precipitated into methanol and/or isolated by vacuum filtration.

As shown in FIG. 1, the one or more polyurethanes 102 can comprise a hard segment and/or a soft segment. The hard segment can originate from the diisocyanate monomer 118 and low molecular weight diol 114. Further, the number of hard segments within the one or more polyurethanes 102 can be defined by "x", where "x" can be a number (e.g., a decimal number) ranging, for example, from greater than or equal to 0 and less than or equal to 1000. The soft segment can originate from the diisocyanate monomer 118 and macro diol 116. Further, the number of soft segments within the one or more polyurethanes 102 can be defined by "y", where "y" can be a number (e.g., a decimal number) ranging, for example, from greater than or equal to 0 and less than or equal to 1000. In various embodiments, the distribution of the one or more hard segments and soft segments can be random along the polymer backbone of the one or more polyurethanes 102 (e.g., as indicated by "ran" in FIG. 1).

Figure 2:
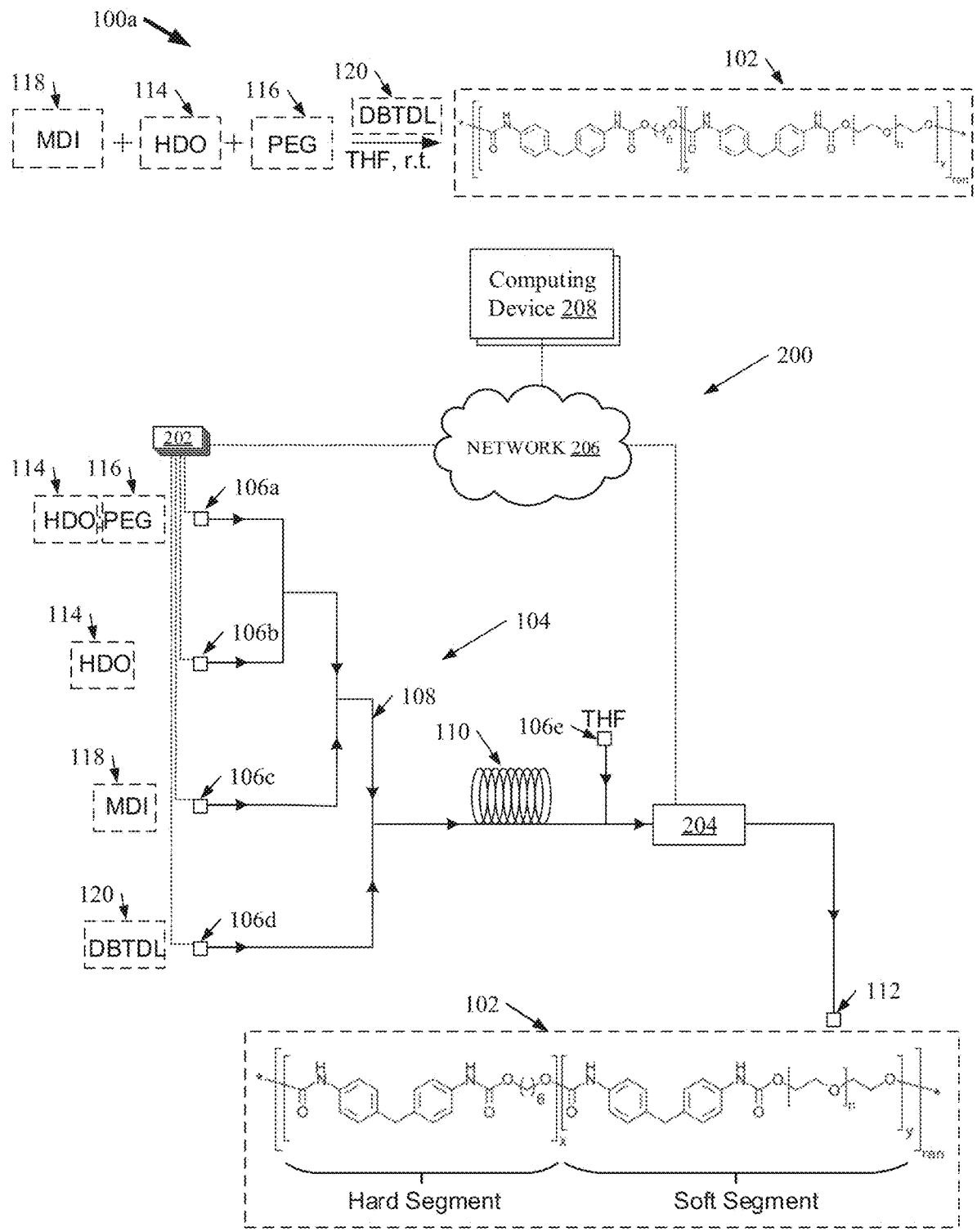
FIG. 2 illustrates a diagram of an example, non-limiting polymerization scheme for the synthesis of polyurethane within one or more flow reactors controlled by one or more autonomous computer systems in accordance with one or more embodiments described herein.

FIG. 2 illustrates a diagram of the example, non-limiting polymerizations scheme 100a that can exemplify the features of polymerization scheme 100 by employing HDO as the low molecular weight diol 114, PEG (e.g., PEG1500) as the macro diol 116, MDI as the diisocyanate monomer 118, and DBTDL as the catalyst 120 in accordance with various embodiments described herein. Repetitive description of like elements employed in other embodiments described herein is omitted for sake of brevity. A polyurethane 102 chemical structure resulting from the exemplary chemical reactants is shown in FIG. 2. One of ordinary skill in the art will recognize that the chemical reactants illustrated in FIG. 2 are shown to exemplify the features of the polymerization scheme 100, and alternate chemical reactants (e.g., alternate low molecular weight diols 114, macro diols 116, diisocyanate monomers 118, and/or catalysts 120) can be employed in accordance with the various embodiments described herein (e.g., in accordance with at least the description of FIG. 1).

Use of the flow reactor 104 to execute the polymerization scheme 100 can allow the modification of synthesis variables on demand. For example, the flow reactor 104 setup depicted in FIG. 2 can allow modification of the diol ratio HDO:PEG from 50:50 to 100:0 on demand; thereby facilitating: the generation of a library of the respective polyurethanes 102 with various amounts of hard and soft segments; and/or the screening of the relationship between composition and material properties.

To demonstrate the efficacy of executing the polymerization scheme 100 in the flow reactor 104, five linear polyurethanes 102 with different weight fractions of hard segment ($w_{HS}$) were prepared in accordance with the features shown in FIG. 2 in a single experiment and collected once the reactant conversion stabilized at greater or equal 90%. The results of the experiment are presented in Table 1 below. For example, "FlowPU1" can be a first example polyurethane 102 having a first amount of hard segment, "FlowPU2" can be a second example polyurethane 102 having a second amount of hard segment, "FlowPU3" can be a third example polyurethane 102 having a third amount of hard segment, "FlowPU4" can be a fourth example polyurethane 102 having a fourth amount of hard segment, and "FlowPU5" can be a fifth example polyurethane 102 having a fifth amount of hard segment. The formation of the polyurethanes 102 was confirmed by $^1$H NMR, FTIR and $w_{HS}$ calculated from the molar fraction of HDO in total diols $x_{HDO}$. Theoretical values (e.g., denoted by "th" subscript) and experimental values (e.g., denoted by "exp" subscript) for $x_{HDO}$ are thereby in agreement with an average deviation of only −3.2±1.1%. GPC analysis returned high weight-average molecular weights $M_w$ in the range of 30.8-39.6 kilodaltons (kids) and low dispersity values of 1.3-1.4. Increasing $w_{HS}$, and thereby increasing the density of urethane groups along the polymer backbone, can result in a shift of the glass transition temperature $T_g$ of the polyurethanes 102 to higher values, which can be indicative of decreasing chain mobility (e.g., rendering the polyurethanes 102 more rigid).

TABLE 1

Reaction specifications for the synthesis of polyurethanes 102 with variable amounts of hard segment.

| Sample | Flow rate (μl/min) | | | $x_{HDO,th}$ (%) | $w_{HS,th}$ (%) | $x_{HDO,exp}$ (%)$^a$ | $w_{HS,exp}$ (%)$^a$ | Conv. (%)$^a$ | $M_w$ (kDa)$^b$ | Đ$^b$ | $T_g$ (° C.)$^c$ |
|---|---|---|---|---|---|---|---|---|---|---|---|
| | Diol$_{total}$ | HDO | PEG:HDO | | | | | | | | |
| FlowPU1 | 24.0 | 2.4 | 21.6 | 55 | 31 | 51 | 29 | 90 | 14.4 | 1.43 | −38 |
| FlowPU2 | 24.0 | 7.2 | 16.8 | 65 | 38 | 63 | 36 | 94 | 18.2 | 1.45 | −35 |
| FlowPU3 | 24.0 | 12.0 | 12.0 | 75 | 47 | 73 | 44 | 95 | 20.6 | 1.55 | −36 |
| FlowPU4 | 24.0 | 16.8 | 7.2 | 85 | 60 | 81 | 54 | 98 | 19.8 | 1.56 | −24 |
| FlowPU5 | 24.0 | 21.6 | 2.4 | 95 | 83 | 91 | 72 | 98 | 18.0 | 1.68 | −19 |

$^a$Calculated from $^1$H NMR analysis.
$^b$Determined by GPC vs PS standards.
$^c$Determined by DSC.

In various embodiments, reactant conversion of the polymerization reactions can be determined by tracking the disappearance of hydroxy protons of the diols and the subsequent appearance of the methylene groups adjacent to the urethane linkage. The reactant conversion was calculated by Equation 4 where "$A_{Pol,-CH_2-OCONH-}$" is the area of the polymeric methylene group adjacent to the urethane moiety (4.16 ppm for PEG and 4.03 ppm for PCL and HDO) and "$A_{Mon,-OH}$" is the area of the alcohol proton of the diols (4.59 ppm for PEG, 4.36 ppm for PCL and HDO).

$$\text{Conversion} = \frac{A_{Pol,-CH_2-OCONH-}}{A_{Pol,-CH_2-OCONH-} + 2A_{Mon,-OH}} \quad (4)$$

The reactant conversion for each diol can be calculated separately and is shown as an average of both according to the presence of each in the polyurethane 102.

The fraction of low molecular diol 114 (e.g., HDO) in the total diols incorporated in the polyurethane 102 ($x_{HDO}$) can be determined from the $^1$H NMR spectrum of the purified product by integrating the areas related to the peaks of the methylene groups attached to the urethane linkage in both diols. For example, where the macro diol 116 is PEG and the low molecular weight diol 114 is HDO, $x_{HDO}$ can be determined in accordance with Equation 5.

$$x_{HDO} = \frac{A_{HDO,-CH_2-OCONH-}}{A_{PEG,-CH_2-OCONH-} + A_{HDO,-CH_2-OCONH-}} \quad (5)$$

Where "$A_{HDO,-CH_2-OCONH-}$" can be centered at 4.03 ppm, and "$A_{PEG,-CH_2-OCONH-}$" can be at 4.16 ppm.

In $^1$H NMR spectra for polyurethanes 102 incorporating PCL as the macro diol 116 and HDO as the low molecular diol 114, the area at 4.10-3.90 ppm shows an overlap of the signals respectively corresponding to PCL and HDO methylene protons next to the urethane group, "$A_{PCL+HDO,-CH_2-OCONH-}$" Thereby, Equation 6 can be employed considering the experimentally determined degree of polymerization $DP_{NMR}$ and the area of the signal at 2.27 ppm corresponding to PCL methylene protons next to the PCL carbonyl carbon atom "$A_{PCL,-CH_2-CO-}$."

modified by varying the flow rates for the PEG1500:HDO (50:50) mixture and the HDO-pure solution. Table 2 depicts synthesis reaction conditions for the polyurethane 102 examples included in Table 1.

TABLE 2

Synthesis reaction parameters for the tunable percentage of hard segment in the polyurethanes 102

| | Molar flow rate (µmol/min) | | Flow rate (µl/min) | | | PEG1500: HDO | Molar ratio PEG1500:HDO | HS (%) |
|---|---|---|---|---|---|---|---|---|
| Entry | MDI | Diols$_{total}$ | MDI | Diols$_{total}$ | HDO | | | |
| FlowPU1 | 11.5 | 11.5 | 6 | 24 | 2.4 | 21.6 | 45:55 | 31.2 |
| FlowPU2 | 11.5 | 11.5 | 6 | 24 | 7.2 | 16.8 | 25:65 | 37.8 |
| FlowPU3 | 11.5 | 11.5 | 6 | 24 | 12 | 12 | 25:75 | 46.9 |
| FlowPU4 | 11.5 | 11.5 | 6 | 24 | 16.8 | 7.2 | 15:85 | 60.3 |
| FlowPU5 | 11.5 | 11.5 | 6 | 24 | 21.6 | 2.4 | 5:95 | 82.5 |

$$x_{HDO} = \frac{2}{2 + DP_{NMR}\left(\frac{A_{PCL+HDO,-CH_2-OCONH-}}{A_{PCL,-CH_2-CO-}} - 1\right)} \quad (6)$$

The percentage of HDO can further used to determine the percentage of hard segment in the polyurethanes 102.

The low molecular weight diols 114 and the macro diols 116 can have different thermal properties. The low molecular weight diols 114 can form hard segments in the polymer backbone of the polyurethanes 102, where the hard segments have melting temperatures above ambient conditions. The macro diols 116 can form soft segments in the polymer backbone of the polyurethanes 102, where the soft segments can have glass transition temperatures below ambient conditions. Segmented polyurethanes can be synthesized using diols with significantly different thermal properties. For example, the hard segments of the polyurethanes 102 can be formed from MDI and HDO, and the corresponding hard segment weight fraction "$w_{HS}$" can be calculated in accordance with Equation 7.

$$w_{HS} = \frac{M_{MDI} + x_{HDO}M_{HDO}}{M_{MDI} + x_{HDO}M_{HDO} + (1 - x_{HDO})M_{macrodiol}} \quad (7)$$

Where "$M_{MDI}$" can be the molecular weight of MDI, "$M_{HDO}$" can be the molecular weight of HDO, "$M_{macrodiol}$" can be the molecular weight of the macro diol 116 and "$x_{HDO}$" is the mol fraction of HDO in the polyurethanes 102.

In various embodiments, the polyurethanes 102 included in Table 1 can be prepared using the one or more flow reactors 104 in accordance with the following. In a $N_2$-filled glovebox a 0.48 M solution PEG1500:HDO (50:50) can be prepared in anhydrous THF by dissolving 4920 mg (3.20 mmol, 0.50 eq.) of PEG1500 and 378 mg (3.20 mmol, 0.50 eq.) of HDO to a total volume of 13.3 mL, and a 0.48 M solution of only HDO by dissolving 378 mg (3.20 mmol, 0.50 eq.) of HDO in anhydrous THF to 6.6 mL. A 1.92 M MDI solution can be prepared by dissolving 1602 mg (6.40 mmol, 1 eq.) of MDI in anhydrous THF to a total volume of 3.3 mL. A 19.2 mM DBTDL solution can be prepared by dissolving 4.0 mg (6.4·10$^{-3}$ mmol, 1·10$^{-3}$ eq.) of DBTDL in 3.2 mL anhydrous THF. The residence time in the one or more flow reactor 104 was set to 20 minutes corresponding to a total flow rate of 36 µL/min. The molar feed ratio between macro diol PEG1500 and HDO was periodically As shown in FIG. 2, the one or more flow reactors 104 can further be coupled to one or more reactor control systems 200. In various embodiments, the one or more reactor control systems 200 can comprise one or more PID controllers 202, measurement devices 204, networks 206, and/or computing devices 208. In one or more embodiments, the one or more PID controllers 202 can be coupled to the one or more inlets 106. For example, a first PID controller 202 can be coupled to the first inlet 106a, a second PID controller 202 can be coupled to the second inlet 106b, a third PID controller 202 can be coupled to the third inlet 106c, a fourth PID controller 202 can be coupled to the fourth inlet 106d, and/or a fifth PID controller 202 can be coupled to the fifth inlet 106e. The one or more PID controllers 202 can be coupled to the one or more inlets 106 via a direct electrical connection and/or a wireless connection.

In various embodiments, the one or more PID controllers 202 can be employed by the reactor control system 200 to control the one or more inlets 106. For example, the one or more PID controllers 202 can control when the one or more inlets 106 are in an open or closed state. In another example, the one or more PID controllers 202 can control the duration of time a given inlet 106 is in an open or closed state. In a further example, the one or more PID controllers 202 can be coupled to one or more pumps (not shown) of the inlets 106, and thereby control a pressure at which chemical reactants are introduced into the flow reactor 104 to modify one or more flow rates of the chemical reactants.

As shown in FIG. 2, the one or more PID controllers 202 can be further coupled to the one or more computing devices 208. The one or more PID controllers 202 can be coupled to the one or more computing devices 208 directly or via the one or more networks 206 (e.g., via a direct electrical connection and/or via a wireless connection). Additionally, the one or more computing devices 208 can be coupled to the one or more measurement devices 204 directly or via the one or more networks 206 (e.g., via a direct electrical connection and/or via a wireless connection).

The one or more measurement devices 204 can be positioned adjacent to one or more channels 108 of the flow reactor 104. For example, the one or more measurement devices 204 can be positioned downstream the one or more reactor loops 110. In various embodiments, the one or more measurement devices 204 can measure and/or monitor chemical and/or physical properties of the chemical stream within a portion of the one or more channels 108. For example, the one or more measurement devices 204 can measure and/or monitor the chemical and/or physical properties of the synthesized polyurethanes 102 within the one or more channels 108. For instance, the one or more measurement devices 204 can measure and/or monitor properties of the synthesized polyurethanes 102 prior to the polyurethanes 102 exiting the one or more flow reactors 104. In one or more embodiments, the one or more measurement devices 204 can be in fluid communication with the one or more channels 108. In one or more embodiments, the one or more measurement devices 204 can be outside of fluid communication with the one or more channels 108 and can measure and/or monitor properties of the stream of chemicals through the walls of the channels 108 (e.g., at least a portion of the one or more channels 108 can be transparent, and the one or more measurement devices 204 can optically measure and/or monitor the chemical stream). Example types of data that can be measured and/or monitored by the one or more measurement devices 204 can include, but are not limited to: FTIR spectra, NMR spectra, ultraviolet-visible ("UV-Vis") spectra, near-infrared ("NIR") spectra, a combination thereof, and/or the like. Example types of measurement devices 204 can include, but are not limited to: Nicolet iS5 FTIR Spectrometer in ATR mode equipped with a flow cell, Nanalysis NMReady-60pro with flow cell kit, Agilent Cary 5000 UV-Vis-NIR with flow-through cuvette, a combination thereof, and/or the like. For example, the one or more measurement devices 204 can be an ATR-FTIR device with flow cell positioned in-line with a portion of the one or more channels 108 to monitor the reactant conversion of the polymerization reaction inside the flow reactor 104 in real-time by following the monomer-characteristic NCO-stretching band at about 2270 $cm^{-1}$.

In various embodiments, the one or more computing devices 208 can control the one or more PID controllers 202 based on data collected and/or generated by the one or more measurement devices 204 to modify synthesis conditions within the one or more flow reactors 104. In one or more embodiments, the one or more computing devices 208 can generate one or more computer models to determine how modifying the operation of one or more inlets 106 can affect the chemical or physical properties of polyurethanes 102 synthesized in the flow reactor 104 and observed by the one or more measurement devices 204. For example, the one or more computing devices 208 can identify when the polyurethanes 102 being synthesized in the flow reactor 104 have chemical and/or physical properties outside of a target property profile based on the data collected and/or generated by the one or more measurement devices 204. For instance, the one or more computing devices 208 can identify whether the polyurethane 102 polymerization reaction is achieving a desired reactant conversion. Further, the one or more computing devices 208 can determine one or more modifications to the amount and/or flow rate of one or more of the chemical reactants that could result in the properties of subsequently synthesized polyurethanes 102 complying with the target property profile based on one or more computer models. Additionally, the one or more computing devices 208 can control the one or more PID controllers 202 to effectuate the one or more modifications.

To demonstrate the efficacy of the catalyst 120 in the polymerization scheme 100, three different catalysts 120 were investigated for the polymerization of PEG1500:HDO and MDI using the flow reactor 104. For each polymerization the monomer solutions were prepared as follows. In a $N_2$-filled glovebox a 0.48 molar (M) solution of PEG1500:HDO (40:60) solution was prepared by dissolving 2243 milligrams (mg) (1.46 millimole (mmol), 0.40 eq.) of PEG1500 and 259 mg (2.19 mmol, 0.60 eq.) of HDO in anhydrous THF to a total volume of 7.6 mL. A 1.92 M MDI solution was prepared by dissolving 913 mg (3.65 mmol, 1.00 eq.) of MDI in anhydrous THF to a total volume of 1.9 mL.

A first reaction was catalyzed by 1.0 mol-% DBTDL, where a 19.2 mM DBTDL solution was prepared by dissolving 23 mg ($3.65 \cdot 10^{-2}$ mmol, 0.01 eq.) of DBTDL in anhydrous THF to a total volume of 1.9 mL. A second reaction was catalyzed by 0.1 mol-% DBTDL, where a solution of 1.92 mM DBTDL was prepared by dissolving 2.0 mg ($3.65 \cdot 10^{-3}$ mmol, $1 \cdot 10^{-3}$ eq.) of DBTDL in 1.9 mL anhydrous THF. Also, a third reaction was catalyzed by 5 mol-% DBU, where a solution of 0.096 M DBU was prepared by dissolving 28 mg (0.182 mmol, 0.05 eq.) of DBU in 1.9 mL of anhydrous THF. Residence time of the reactions can be modified by changing the flow rate associated with each inlet 106. For example, a 4:1:1 flow ratio between PEG1500/HDO:MDI:catalyst solutions can be maintained to keep the stoichiometry constant. For instance, Table 3, shown below, presents residence times and/or flow rates associated with the three different catalyst 120 conditions.

TABLE 3

Residence time and flow rates for the polymerization of PEG1500:HDO (40:60) and MDI catalyzed by 1 mol-% DBTDL, 0.1 mol-% DBTDL or 5 mol-% DBU.

| | Total flow rate(μL/min) | | | |
|---|---|---|---|---|
| τ (s) | Total | MDI | Catalyst | PEG1500:HDO |
| 30 | 1570.8 | 261.8 | 261.8 | 1047.2 |
| 60 | 785.4 | 130.9 | 130.9 | 523.6 |
| 120 | 392.3 | 65.4 | 65.4 | 261.8 |
| 180 | 261.8 | 43.6 | 43.6 | 174.5 |
| 240 | 196.3 | 32.7 | 32.7 | 130.9 |
| 300 | 157.1 | 26.2 | 26.2 | 104.7 |

The reaction was run the 1.5-fold retention time before collecting the synthesized polyurethanes 102 to allow for a steady state in the flow reactor 104. After a synthesis reaction, the flow reactor 104 can be flushed with anhydrous THF. To assess the three reactions described above (e.g., comprising three different catalyst 120 conditions), the polyurethane 102 products can be precipitated in petroleum ether, dried under reduced pressure and re-dissolved in DMSO-$d_6$ for $^1H$ NMR analysis. The crude samples were re-dissolved in THF and precipitated twice in methanol (MeOH). When using DBU as catalyst 120, MeOH with 4 vol-% 2,2,2-trifluoroacetic acid (TFA) was used for the precipitations. The obtained white solids can be dried under reduced pressure and analyzed by $^1H$ NMR, FTIR and GPC.

Figure 3:
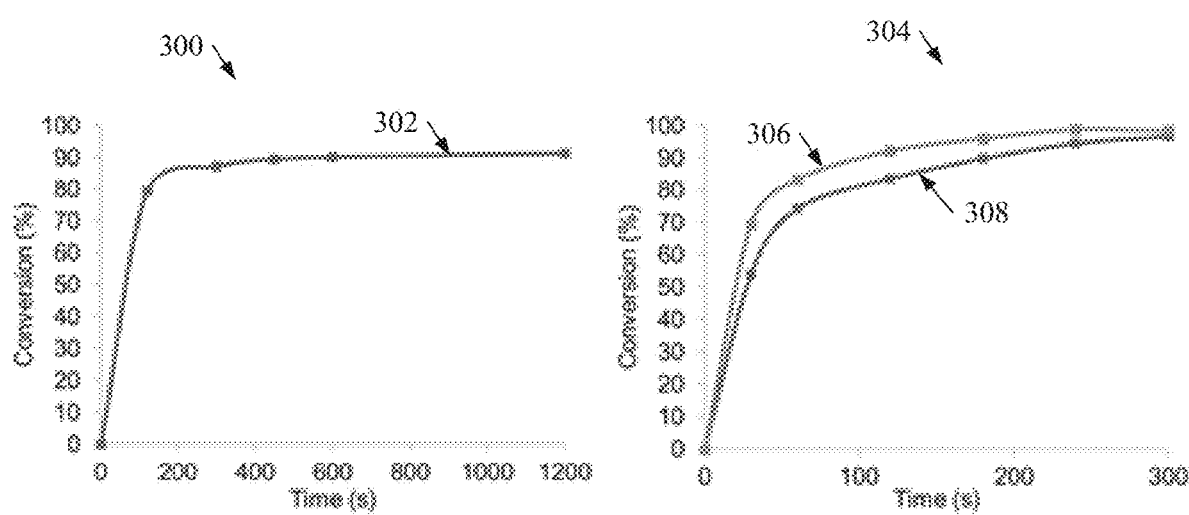
FIG. 3 illustrates diagrams of example, non-limiting graphs depicting the chemical reactant conversion associated with one or more polymerization schemes for the synthesis of polyurethane within one or more flow reactors in accordance with one or more embodiments described herein.

FIG. 3 illustrates a diagram of example, non-limiting graphs depicting the conversion rate over time associated with the polymerization scheme 100a for the three different example catalyst 120 conditions (e.g., 1.0 mol-% DBTDL, 0.1 mol-% DBTDL, and 5.0 mol-% DBU) in accordance with various embodiments described herein. In graph 300, line 302 represents the reactant conversion over time associated with the polymerization scheme 100a, where 0.1 mol-% DBTDL is employed as the catalyst 120. In graph 304, line 306 represents the reactant conversion over time associated with the polymerization scheme 100a, where 5.0 mol-% DBTDL is employed as the catalyst 120, and line 308 represents the reactant conversion over time associated with the polymerization scheme 100a, where 1.0 mol-% DBU is employed as the catalyst 120 (e.g., rather than DBTDL).

In various embodiments, the use of DBTDL as the catalyst 120 can achieve a complete conversion of the chemical reactants to the polyurethane 102 within about 2 min at 1 mol-% catalyst loading. In one or more embodiments, DBTDL can effectively be replaced by DBU, which additionally can be easier to remove during purification with the help of acids.

In various embodiments, an ATR-FTIR device can be employed as one or more of the measurement devices 204. The ATR-FTIR device can be calibrated in accordance with the following description. In a $N_2$-filled glovebox, a 0.32 M solution of MDI can be prepared by dissolving 80.1 mg (0.32 mmol) of MDI in anhydrous THF to a total volume of 1 mL. Additionally, 2 mL of anhydrous THF can be prepared. The MDI solution and the anhydrous THF can be introduced into the flow reactor 104 via respective inlets 106. Flow rates of the MDI and anhydrous THF solutions can be changed every 3 minutes keeping a total flow rate of 36 μL/min, and thus, simulating the consumption of the isocyanate groups of the diisocyanate monomer 118 during the polymerization scheme 100. Table 4, presented below, depicts the calculated flow rates and MDI concentrations related to the example calibration.

TABLE 4

Flow rates, calculated MDI concentration and related conversion for example FTIR calibration.

| Flow rate (μL/min) | | | $C_{MDI,Reactor}$ | Related conversion |
|---|---|---|---|---|
| Total | MDI | THF | (mol/l) | (%) |
| 36 | 36 | 0 | 0.32 | 0 |
| 36 | 32.4 | 3.6 | 0.288 | 10 |
| 36 | 28.8 | 7.2 | 0.256 | 20 |
| 36 | 25.2 | 10.8 | 0.224 | 30 |
| 36 | 21.6 | 14.4 | 0.192 | 40 |
| 36 | 18.0 | 18.0 | 0.16 | 50 |
| 36 | 14.4 | 21.6 | 0.128 | 60 |
| 36 | 10.8 | 25.2 | 0.096 | 70 |
| 36 | 7.2 | 28.8 | 0.064 | 80 |
| 36 | 3.6 | 32.4 | 0.032 | 90 |
| 36 | 0 | 36 | 0 | 100 |

Figure 4:
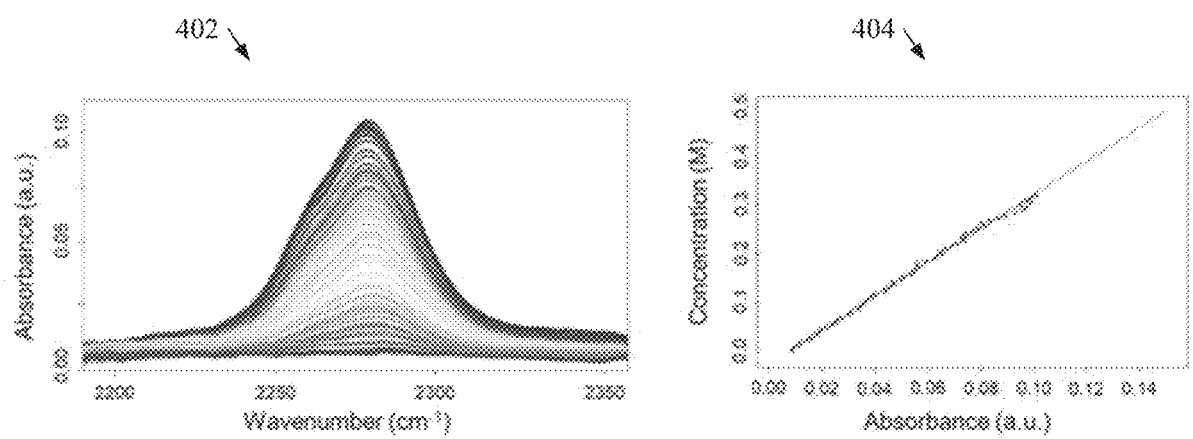
FIG. 4 illustrates diagrams of example, non-limiting graphs regarding fourier-transform infrared ("FTIR") spectra that can characterize reaction conditions within one or more flow reactors in accordance with one or more embodiments described herein.

Additionally, FTIR spectra can be recorded every 20 seconds during the example calibration. FIG. 4 illustrates a diagram of example, non-limiting graphs regarding FTIR spectra that can be recorded during the example calibration in accordance with various embodiments described herein. Graph 402 depicts a section of the FTIR spectra showing a decrease in absorbance of the characteristic NCO band at 2270 $cm^{-1}$ with decrease in concentration. As evidenced by graph 402, high flow rates with short residence times can be associated with synthesis reactions having low reactant conversion; whereas low flow rates with long residence times can be associated with synthesis reactions having high reactant conversion. Graph 404 depicts a plot showing the dependence between absorbance at 2270 $cm^{-1}$ and concentration of MDI.

A correlation can exist between concentration of MDI ("$c_{MDI}$") and the absorbance at 2270 $cm^{-1}$ ("$Abs_{2270}$"). A linear regression can return Equation 8 to numerically describing the dependence.

$$c_{MDI} = -0.0264 + 3.4615 \times Abs_{2270} \qquad (8)$$

Equation 8 can be employed by the one or more computing devices 208 to calculate the reactant conversion during the synthesis reaction within the one or more flow reactors 104.

In various embodiments, reactant conversion can be autonomously determined by the one or more computing devices 208 in accordance with a predefined schedule (e.g., reactant conversion can be determined on a set time interval, such as every 20 seconds). Table 5, presented below, reactant conversion data regarding the example polyurethane 102 polymerization reactions characterized by Tables 1-2. The product fractions were collected once the reactant conversion reached stable values above 90% and directly precipitated into petroleum ether, filtered, re-dissolved in THF and precipitated in MeOH. After repeating the purification by precipitation two more times, solvents were removed under reduced pressure and the products characterized by FTIR, $^1$H NMR, GPC, TGA and DSC.

TABLE 5

Experimental details for polyurethane 102 examples FlowPU1 to FlowPU5.

| Entry | Conversion (%)[a] | $x_{HDO}$ (%)[a] | $M_n$ (kg/mol)[b] | $Đ$[b] | $T_g$ (° C.)[c] |
|---|---|---|---|---|---|
| FlowPU1 | 90 | 50 | 22.0 | 1.43 | −38 |
| FlowPU2 | 94 | 60 | 29.0 | 1.45 | −35 |
| FlowPU3 | 95 | 73 | 29.8 | 1.55 | −36 |
| FlowPU4 | 98 | 81 | 29.0 | 1.56 | −24 |
| FlowPU5 | 98 | 91 | 27.3 | 1.68 | −19 |

[a]Determined by $^1$H NMR,
[b]Determined by GPC vs PS standards.
[c]Determined by DSC.

Figure 5:
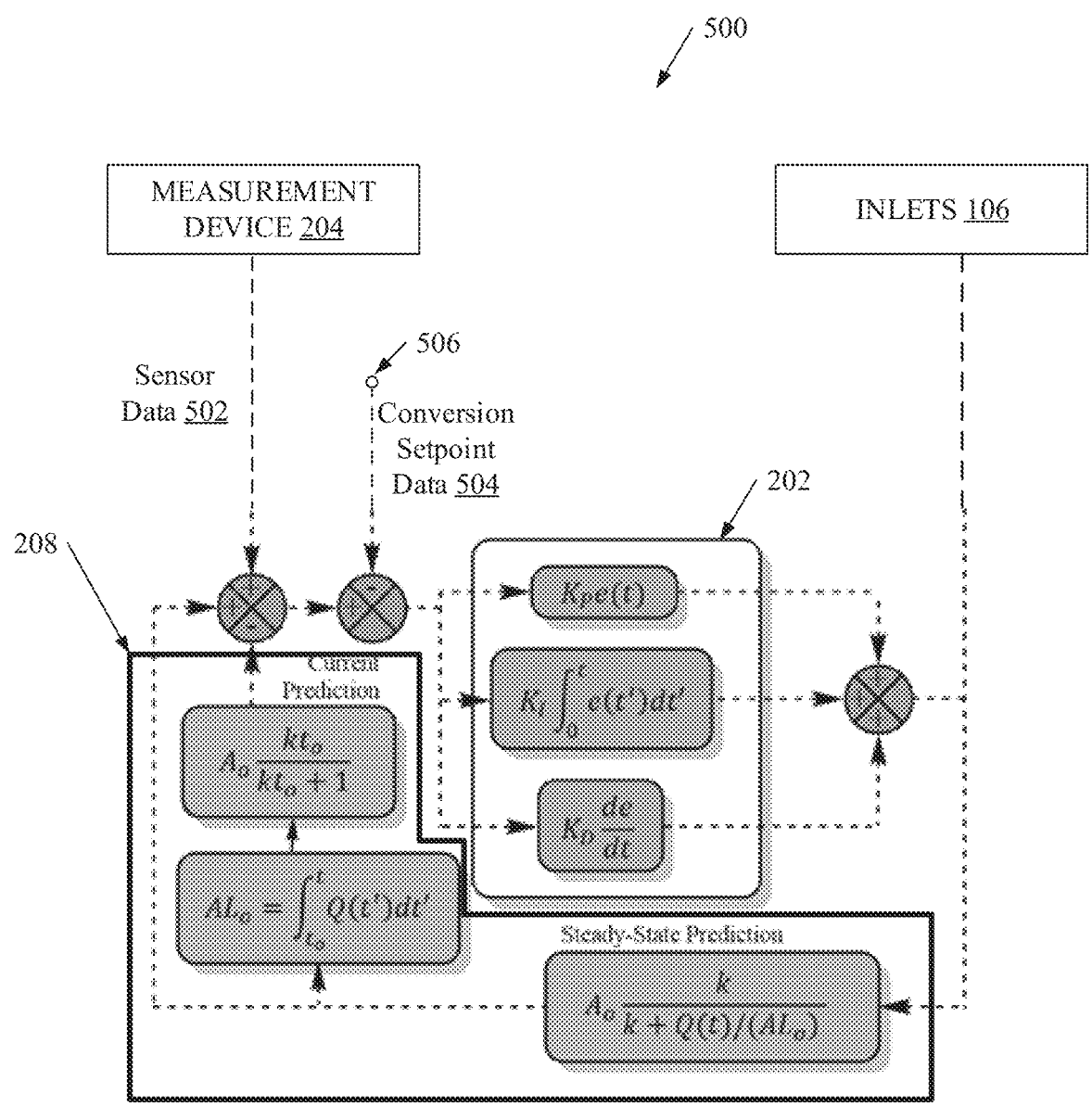
FIG. 5 illustrates a diagram of an example, non-limiting control schemes that can be employed by one or more reactor control systems to modify one or more polyurethane polymerization reactions within one or more flow reactors in accordance with one or more embodiments described herein.

FIG. 5 illustrates a diagram of an example, non-limiting control scheme 500 that can be employed by the reactor control system 200 to control the one or more flow reactors 104 in accordance with one or more embodiments described herein. Repetitive description of like elements employed in other embodiments described herein is omitted for sake of brevity. In various embodiments, the one or more PID controllers 202 can set the total flow rate ("$Q_0$") for the one or more inlets 106. Also, the length of the flow reactor 104 (e.g., including the length of the one or more channels 108 and reactor loops 110) can be represented by "$L_0$" and cross-sectional area "A". The kinetic constant can be represented by "k", the flow rate at the pumps by "Q(t)", and the stoichiometric equivalents relative to a reference concentration (0.32 M) by "$A_0$".

In accordance with various embodiments, the one or more measurement devices 204 can be one or more ATR-FTIR sensors positioned downstream of the one or more reactor loops 110, where the sensor data 502 can regard conversion values of one or more of the chemical reactants. Additionally, conversion setpoint data 504 can be supplied to the one or more computing devices 208 (e.g., via one or more input devices 506). In various embodiments, the conversion setpoint data 504 can characterize a targeted point in the reactant conversion. One or more entities employing the flow reactor 104 and/or reactor control system 200 can define the conversion setpoint data 504 via one or more input devices 106, such as one or more computer devices. Given the vibrational characteristics of the diisocyanate monomer 118 (e.g., MDI) with the asymmetric NCO stretching centered at about 2270 cm$^{-1}$, the one or more computing devices 208 can calculate the conversion of the reaction to control the one or more flow reactors 104 and execute the polymerization scheme 100. For instance, the one or more computing devices 208 can take as its input the reactant conversion of the synthesis reactions occurring in the one or more flow reactors 104 as measured by the one or more measurement devices 204 to calculate the flow rates of the one or more inlets 106. Higher measured reactant conversions can be expected for diminished flow rate and low conversions for high flow rates.

In various embodiments, a variable time delay can be experienced between process changes (e.g., between flow rate changes, and/or data collection by the one or more measurement devices 204 at the end of the flow reactor 104). The time delay can range from, for example, greater than or equal to a few milliseconds and less than or equal to 1 hour (e.g., 5 minutes). In one or more embodiments, the Smith predictor algorithm can be employed by the one or more computing devices 208 to mitigate poor controller performance due to the time delay. For example, the one or more computing devices 208 can generate a computer process model to predict future effects of altering the flow rates of one or more of the chemical reactants. Thereby, the one or more computing devices 208 can employ the Smith predictor algorithm in the computer process model to control the one or more PID controllers 202. By employing this model prediction, the delay time can be mitigated and the PID controllers 202 can receive immediate, or near immediate, feedback to process changes to the flow reactor 104 settings. In one or more embodiments, the one or more computing devices 208 can further increase the precision of the PID controllers 202, and thereby flow reactor 104 settings, by controlling the one or more PID controllers 202 based on the future predictions in addition to the computer process model's current prediction as compared to the data collected at the one or more measurement devices 204. In other words, the one or more computing devices 208 can analyze the accuracy of a past prediction by comparing the prediction to the chemical and/or physical characteristics observed by the one or more measurement devices 204. Thus, the one or more computing devices 208 can control the one or more PID controllers 202 based on a signal that can mitigate the delay time problem and any discrepancy between the process model and the actual measurements made by the one or more measurement devices 204.

In one or more embodiments, the process model employed by the one or more computing devices 208 can be a 2$^{nd}$ order kinetic scheme utilizing a rate constant value giving 90% conversion at 5 minutes for an initial MDI concentration of 0.32 M. The plug flow approximation was employed to computer the reaction/residence time at the one or more measurement devices 204. The expected inverse relationship between conversion at the measurement device 204 and the flow rate is described by Equation 9 and returns the expected steady state or future conversion for the given flow rate.

$$c = \frac{1}{\frac{1}{A_o} + \frac{Q(t)}{AkL_0 A_o^2}} \quad (9)$$

Likewise, numerically solving Equation 9 can enable the one or more computing devices 208 to compute the current expected conversion at the one or more measurement devices 204 in accordance with Equation 10 so that the discrepancy between the process model and the measurement can be computed.

$$\int_0^\tau Q(t')dt' = L_0 A \quad (10)$$

$$c = \frac{A_o}{1 + \frac{1}{ktA_o}}$$

Figure 6:
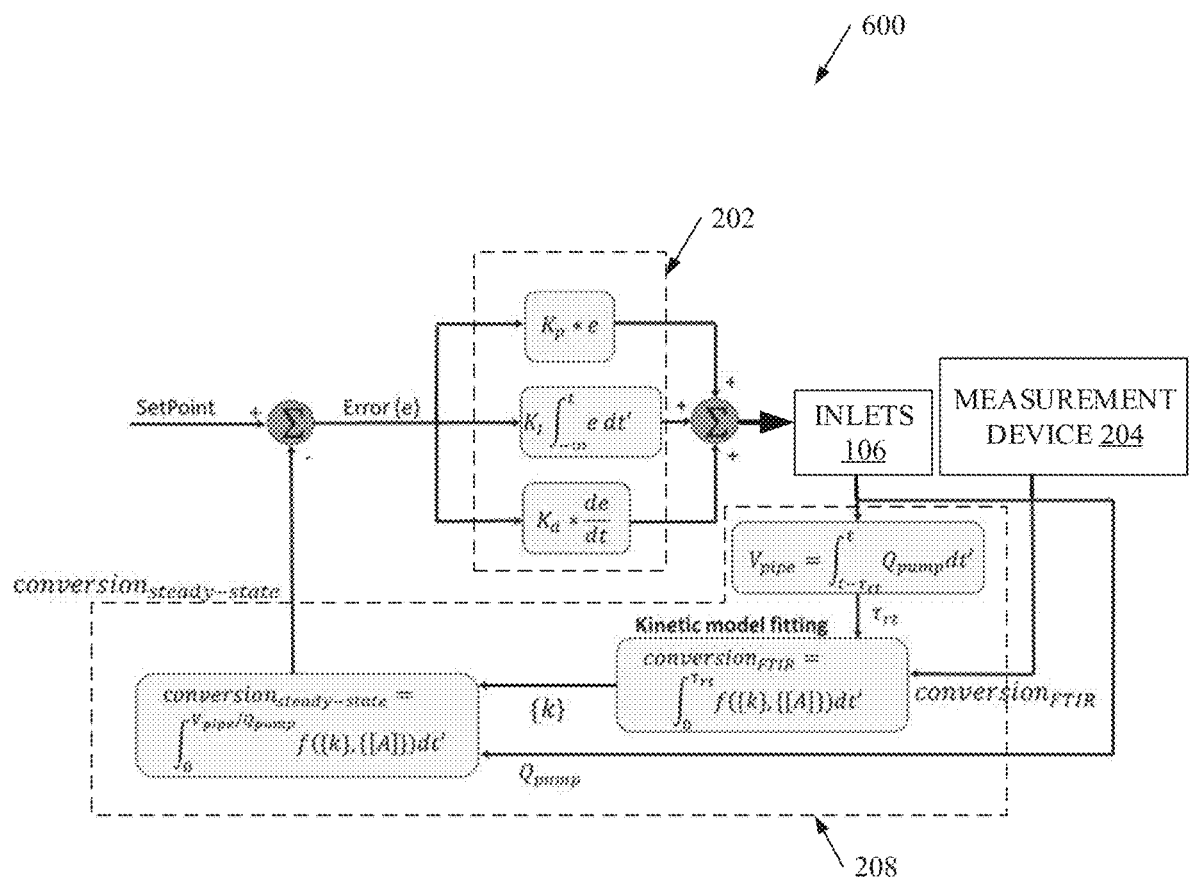
FIG. 6 illustrates a diagram of an example, non-limiting control schemes that can be employed by one or more reactor control systems to modify one or more polyurethane polymerization reactions within one or more flow reactors in accordance with one or more embodiments described herein.

FIG. 6 illustrates a diagram of another example, non-limiting control scheme 600 that can be employed by the reactor control system 200 to control the one or more flow reactors 104 in accordance with one or more embodiments described herein. Repetitive description of like elements employed in other embodiments described herein is omitted for sake of brevity. As shown in FIG. 6, "$f(\{k\},\{[A]\})$" can be the rate law for the chemical process as a function of species concentrations "$\{[A]\}$" and kinetic constants "$\{k\}$". Further, "conversion$_{steady-state}$" can be the conversion at steady state for the flow rate "$Q_{pump}$" based upon kinetic model fitted parameter $\{k\}$; "$\tau_{rt}$" can be the residence time in the flow reactor 104; "conversion$_{FTIR}$" can be a conversion value determined by the one or more measurement devices 204 (e.g., ATR-FTIR sensors). The deviation of the predicted conversion at steady state from the "SetPoint" can be represented by "Error (e)" and can be provided as input to PID controller 202.

In accordance with various embodiments, the one or more measurement devices 204 can be one or more ATR-FTIR sensors positioned downstream of the one or more reactor loops 110, where the sensor data 502 can regard reactant conversion of one or more of the chemical reactants. For example, the reactant conversion can be determined by the one or more measurement devices 204 by tracking infrared ("IR") isocyanate peaks in one or more FTIR analyses. In accordance with one or more embodiments described herein, the one or more FTIR analyses can be based on a calibration of IR isocyanate peaks versus diisocyanate monomer 118 concentration, such as MDI concentration ($c_{MDI}$). For example, a linear regression model can be employed to determine diisocyanate monomer 118 concentration as a function of time ("t"), such as $c_{MDI}$ as a function of time ("$c_{MDI}(t)$"). With known $c_{MDI}(t=0)$ by the MDI stock solution concentration, reactant conversion calculated on demand at the end of the flow reactor 104 can be computed in accordance with Equation 11 below.

$$\text{conversion} = \frac{c_{MDI}(t=0) - c_{MDI}(t)}{c_{MDI}(t=0)} \quad (11)$$

Figure 7:
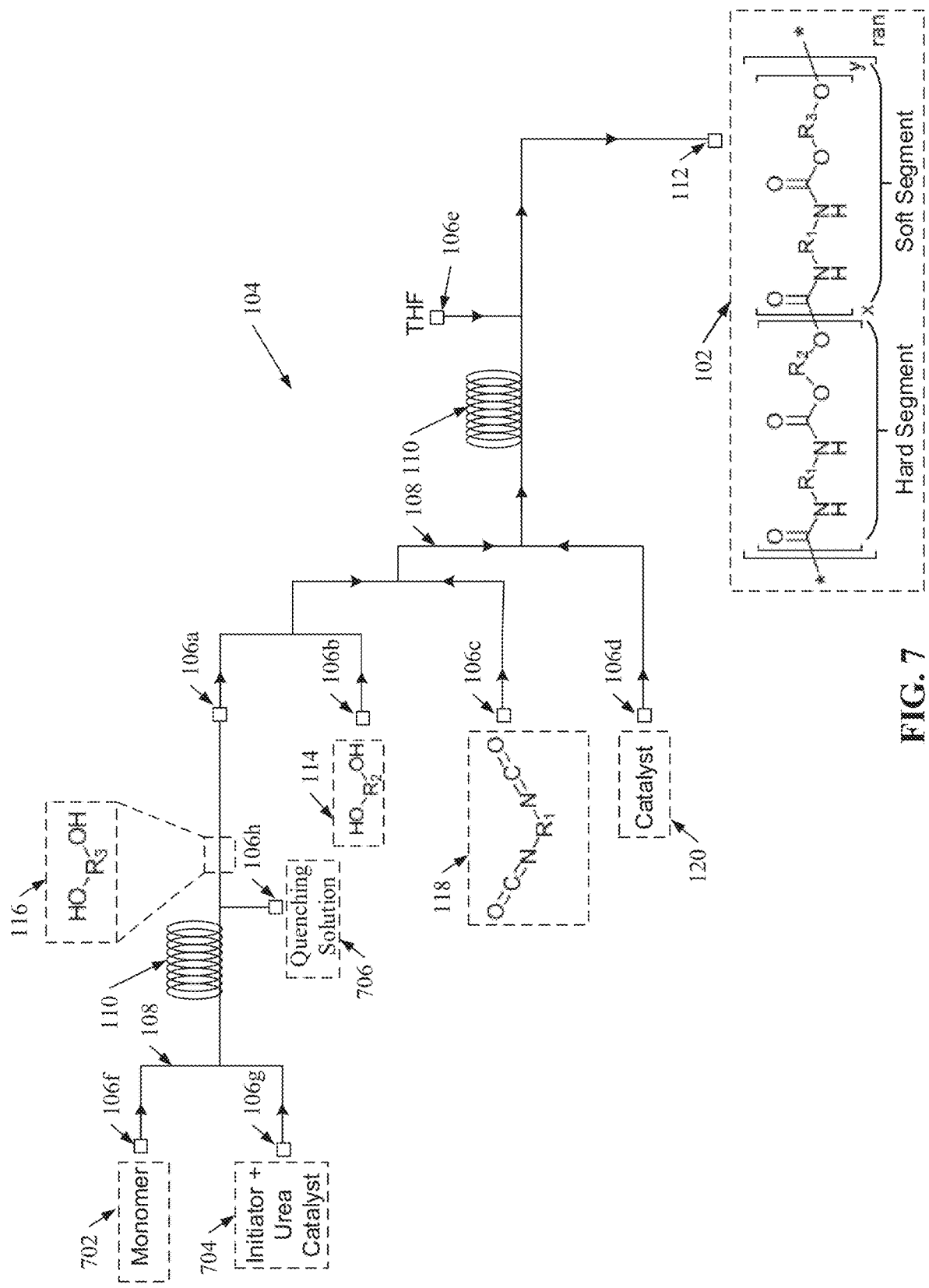
FIG. 7 illustrates a diagram of an example, non-limiting polymerization scheme in which one or more macro diols can be synthesized in a first portion of a flow reactor and supplied to a second portion of the flow reactor for further synthesis of one or more polyurethanes in accordance with one or more embodiments described herein.

FIG. 7 illustrates a diagram of the example, non-limiting polymerization scheme 100, where the one or more macro diols 116 can further be synthesized in the one or more flow reactors 104 in accordance with one or more embodiments described herein. Repetitive description of like elements employed in other embodiments described herein is omitted for sake of brevity. As shown in FIG. 7, the first inlet 106$a$ can introduce a solution of the one or more macro diols 116 into the flow reactor 104 for further mixing with the one or more low molecular weight diols 114, diisocyanate monomers 118, and/or catalysts 120.

In various embodiments, the one or more macro diols 116 can be synthesized in one or more further flow reactors 104 connected to the first inlet 106a. For example, the one or more macro diols 116 can be synthesized from: one or more monomers 702 introduced into a flow reactor 104 via a six inlet 106f; and an initiator/catalyst solution 704 of one or more initiators and urea catalysts introduced into the flow reactor 104 via a seventh inlet 106g. The one or more monomers 702 can be, for example, cyclic monomers (e.g., a cyclic ester monomer). Example types of monomers 702 can include, but are not limited to: ε-caprolactone, γ-valerolactone, γ-butyrolactone, lactide, a combination thereof, and/or the like. The one or more initiators can be, for example, a diol monomer (e.g., a diol monomer comprising an alkyl chain). Example types of initiators can include, but are not limited to: 1,8-octanediol, 1,6-hexanediol, diethylene glycol, a combination thereof, and/or the like. Example urea catalysts can include, but are not limited to: 1,3-Bis[3,5-bis(trifluoromethyl)phenyl]urea, 1-[3,5-Bis(trifluoromethyl)phenyl]-3-[4-(trifluoromethyl)phenyl]urea, N-[3,5-bis(trifluoromethyl)-phenyl]-N'-phenylurea, N-[3,5-bis(trifluoromethyl)phenyl]-N'-cyclohexylurea, 1-phenyl-3-(3-(trifluoromethyl)phenyl)urea, 1,3-Diphenylurea, 1-cyclohexyl-3-phenylurea, the respective thioureas, a combination thereof, and/or the like.

In various embodiments, the initiator/catalyst solution 704 can further include a base compound that can deprotonate the one or more urea catalysts to form an anionic urea catalyst. In one or more embodiments, as acidity of the one or more urea catalysts decreases, the catalytic activity can increase. Additionally, in one or more embodiments the one or more urea catalysts based on the monomer 702 being polymerized. For example, the selection of a urea catalyst to be utilized in a subject ring-opening polymerization ("ROP") can be catered to monomers 702 of different reactivity and/or stability. Therefore, one or more polymerization conditions (e.g., conversion rate and/or molecular weight dispersity) can be adjusted by varying the urea catalyst identity and/or concentration without changing one or more parameters of the flow reactor 104. Further, the one or more monomers 702 can undergo one or more ROPs in the presence of the initiator/catalyst solution 704 to form one or more macro diols 116.

Additionally, the flow reactor 104 facilitating the macro diol 116 synthesis can comprise an eighth inlet 106h. For example, a quenching solution 706 can be introduced into the flow reactor 104 to quench the polymerization reaction forming the one or more macro diols 116. The quenching solution 706 can comprise, for example: benzoic acid, hydrochloric acid, sulfuric acid, carbonic acid, formic acid, citric acid, trifluoroacetic acid, a combination thereof, and/or the like.

While FIG. 7 illustrates two inlets 106 employed to synthesize the one or more macro diols 116 (e.g., sixth inlet 106f and/or seventh inlet 106g), the architecture of the one or more flow reactors 104 is not so limited. For example, a plurality of different monomers 702 can be coupled to respective inlets 106. Thereby, the type of macro diol 116 synthesized in the one or more flow reactors 104 can vary by controlling the inlets 106 to introduce different monomers 702 into the one or more flow reactors 104. Likewise, a plurality of different initiator/catalyst solutions 704 can be coupled to respective inlets 106. For example, different initiator/catalyst solutions 704 can comprise alternate combinations of the various initiators and/or urea catalysts described herein. Thereby, the type of macro diol 116 synthesized in the one or more flow reactors 104 can vary by controlling the inlets 106 to introduce different initiator/catalyst solutions 704 into the one or more flow reactors 104.

Figure 8:
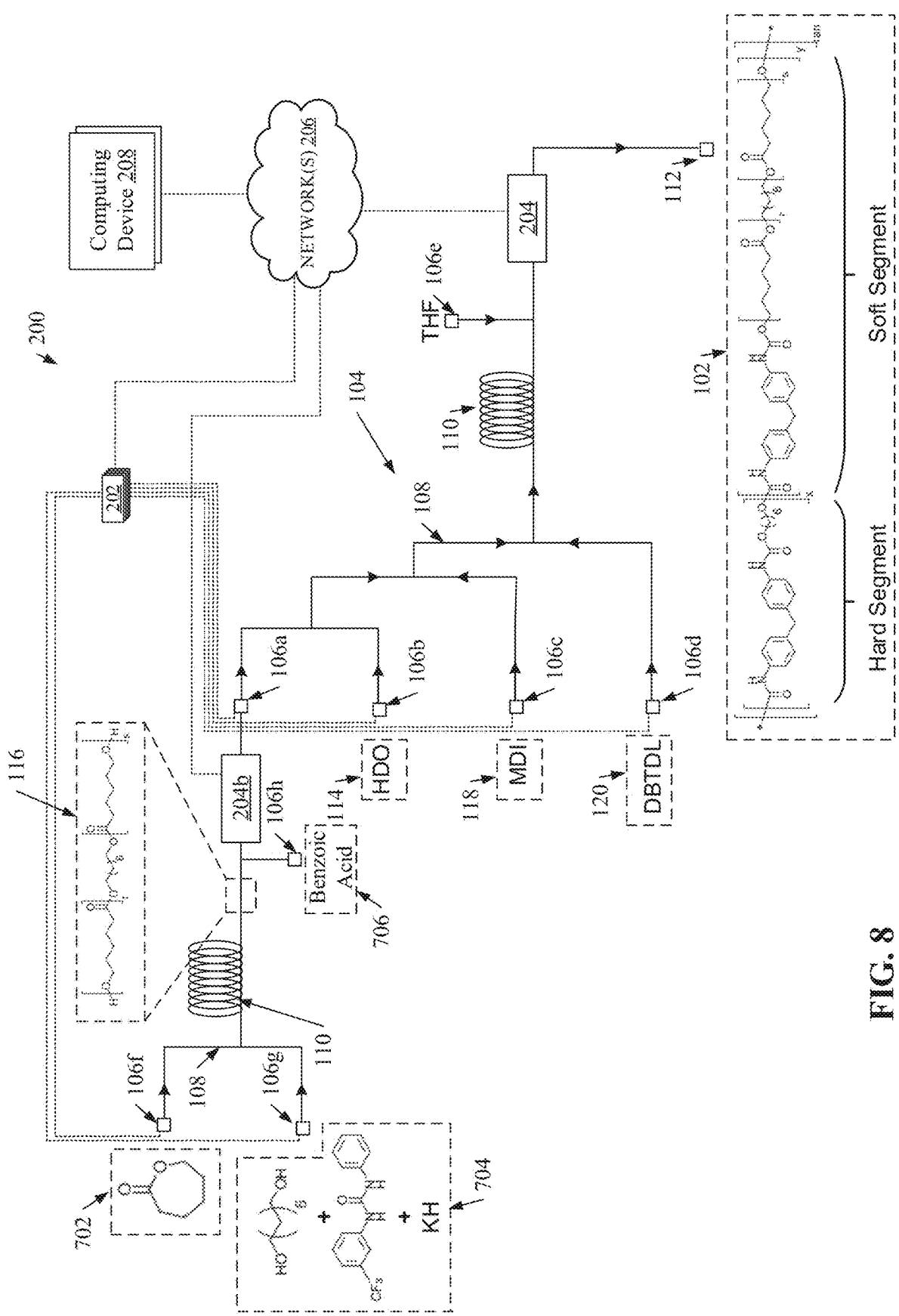
FIG. 8 illustrates a diagram of an example, non-limiting polymerization scheme that can be controlled by an autonomous computing system to synthesis one or more macro diols in a first portion of a flow reactor and/or one or more polyurethanes in a second portion of the flow reactor in accordance with one or more embodiments described herein.

FIG. 8 illustrates a diagram of the example non-limiting polymerization scheme 100 in which: the one or more macro diols 116 can be PCL (e.g., PCL2800) synthesized via one or more flow reactors 104, the one or more low molecular weight diols 114 can be HDO, the diisocyanate monomer 118 can be MDI, and the catalyst 120 can be DBTDL in accordance with one or more embodiments described herein. Repetitive description of like elements employed in other embodiments described herein is omitted for sake of brevity. As shown in FIG. 8, in an exemplary embodiment, the one or more macro diols 116 can be PCL and can be synthesized within one or more reactor loops 110 connected to the first inlet 106a. For example, PCL can be synthesized within the one or more flow reactors 104 in accordance with the following polymerization scheme:

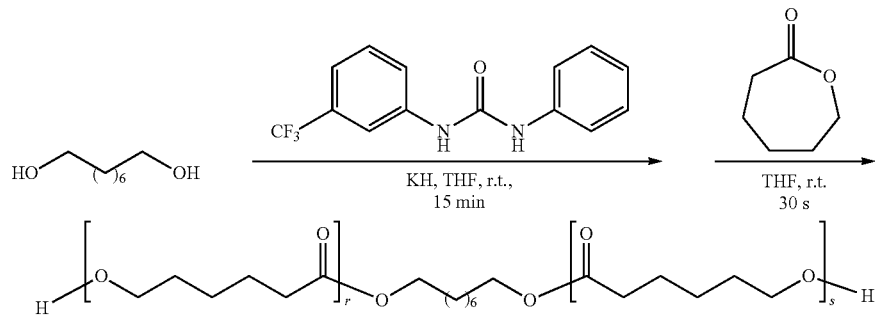

For example, the one or more initiators can be 1,8-octanediol, the one or more urea catalysts can be N'-Phenyl-3-(trifluoromethyl) benzohydrazide, the one or more monomers 702 can be ε-caprolactone, and the one or more macro diols 116 can be PCL2800 (e.g., PCL having a molecular weight of 2800 g/mol). In various embodiments, the one or more monomers 702 and/or initiator/catalyst solutions 704 can be prepared in accordance with the following. In a N₂-filled glovebox a 2.1 M monomer 702 solution can be prepared by dissolving 12.00 g (105.13 mmol) of ε-caprolactone in anhydrous THF up to a total volume of 50 mL. The solution can be further passed through a 0.2 μm PTFE filter. To prepare the initiator/catalyst solution 704, 0.60 g (4.10 mmol, 1.0 eq.) of 1,8-octanediol and 3.45 g (12.32 mmol, 3.0 eq.) of CF₃PhUPh were dissolved in 20 mL anhydrous THF and combined with a suspension of 0.33 g (8.21 mmol, 2.0 eq.) of potassium hydride (KH) in 20 mL of anhydrous THF. Stirring of this mixture can be stopped 15 minutes after the gas formation had ended. The mixture can be further diluted with anhydrous THF to 54 mL and passed through a 0.2 μm PTFE filter. The quenching solution 706 can be prepared by dissolving 6.01 g (49.24 mmol, 12.0 eq.) of benzoic acid in 40 mL of THF. Table 6, presented below, depicts polymerization parameters for the synthesis of PCL2800 shown in FIG. 8.

TABLE 6

Polymerization reaction parameters for synthesizing macro diol 116 PCL2800.

|  | Flow rate | | Molar |
|---|---|---|---|
|  | (ml/min) | (mmol/min) | equivalents |
| Monomer 702 | 1.044 | 2.195 | 25 |
| Initiator/Catalyst Solution 704 | 1.155 | 0.088 | 1 |

Additionally, the synthesis of PCL2800 described above can achieve: a conversion value=88%, a yield=9.17 g of PCL2800, GPC (THF, 25° C.): $M_n$=4.11 kg/mol, $M_w$=5.36 kg/mol, =1.30. $DP_{NMR}$=23.5. $M_{n,NMR}$=2824 g/mol, and/or the following $^1$H NMR analysis: 400 MHz, DMSO-$d_6$, δ):=4.35 (2H), 3.98 (47H), 3.35 (4H), 2.27 (47H, d), 1.75-1.03 (157H).

As shown in FIG. 8, the reactor control system 200 can be scaled to further control the synthesis of the one or more macro diols 116 within the one or more flow reactors 104. For example, one or more of the PID controllers 202 can control operation of the sixth inlet 106f and/or the seventh inlet 106g to modify the flow rates associated with the one or more monomers 702 and/or initiator/catalyst solutions 704 to control the synthesis of the one or more macro diols 116. Additionally, the reactor control system 200 can comprise a second measurement device 204b positioned downstream of the one or more reactor loops 110 employed to synthesize the one or more macro diols 116 and prior to the first inlet 106a. The one or more second measurement devices 204b can collect sensor data regarding chemical and/or physical characteristics of the macro diols 116 to facilitate the one or more computing devices 208 in controlling the flow rate of monomers 702 and/or initiator/catalyst solution 704.

For example, the one or more second measurement devices 204b can be ATR-FTIR devices that can measure reactant conversion. Further, the one or more computing devices 208 can generate one or more computer process models based on the measured reactant conversion and one or more Smith prediction algorithms in accordance with one or more embodiments described herein.

Figure 9:
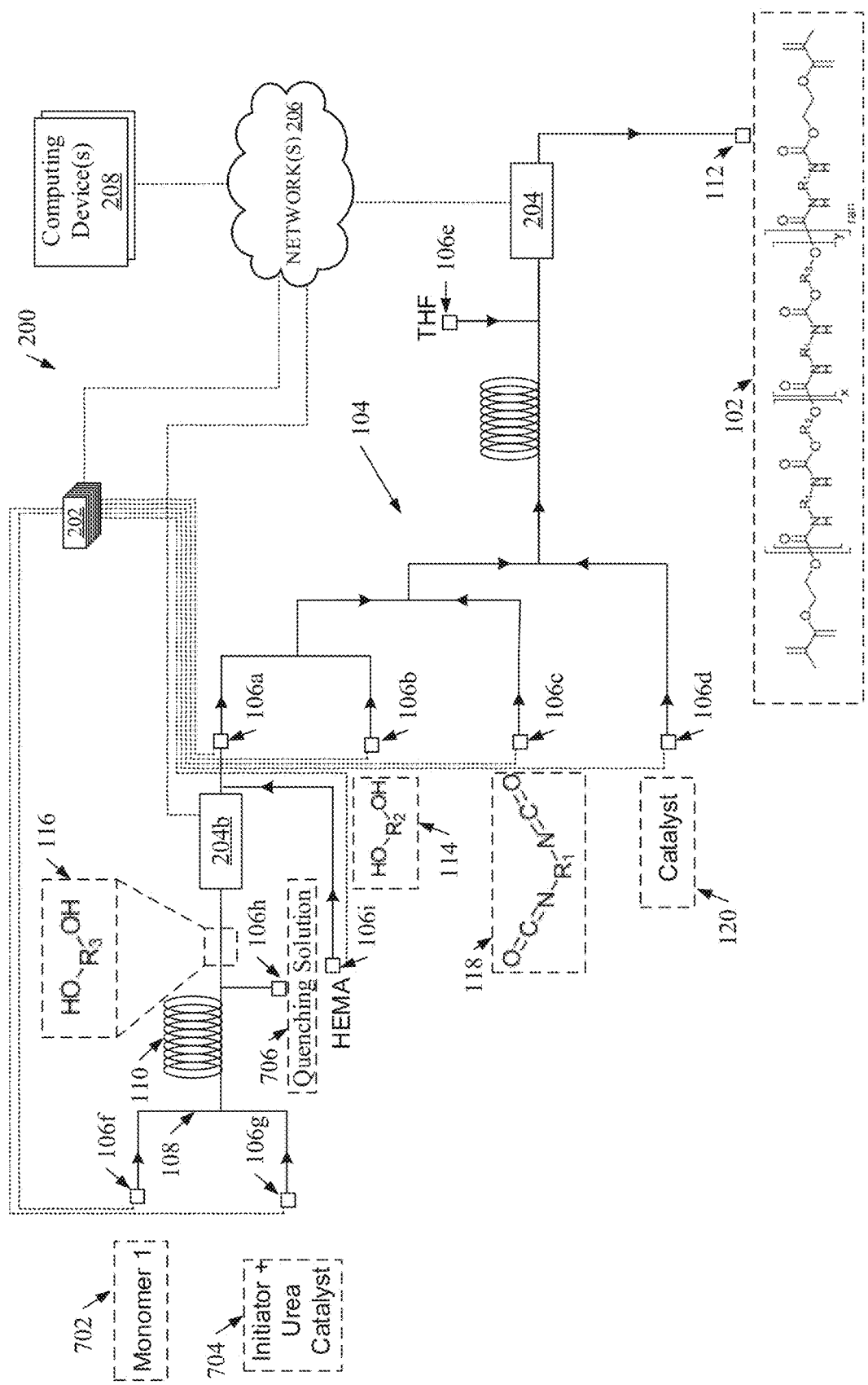
FIG. 9 illustrates a diagram of an example, non-limiting polymerization scheme that can be controlled by an autonomous computing system to synthesis one or more macro diols in a first portion of a flow reactor and/or one or more end-capped polyurethanes in a second portion of the flow reactor in accordance with one or more embodiments described herein.

FIG. 9 illustrates a diagram of the example, non-limiting polymerization scheme 100 further comprising one or more end-cap groups added to the ends of the polymer backbone of the one or more polyurethanes 102 in accordance with one or more embodiments described herein. Repetitive description of like elements employed in other embodiments described herein is omitted for sake of brevity. In various embodiments, chain growth of the one or more polyurethanes 102 can be controlled via one or more end-cap groups positioned at the ends of the polymer backbone of the polyurethanes 102.

For example, the one or more end-cap groups can be derived from a monofunctional alcohol, such as HEMA. As shown in FIG. 9, HEMA can be introduced into the one or more flow reactors 104 via a ninth inlet 106i. For instance, HEMA can be introduced into the one or more flow reactors 104 at a molar fraction $x_{HEMA,th}$ of 9.5% (e.g., equal to 5% hydroxy groups in total hydroxy groups $x_{OH,HEMA}$) while maintaining an equimolar ratio of isocyanate groups to hydroxyl groups. Thereby synthesized HEMA end-capped polyurethanes 102 (e.g., shown in FIG. 9) with molecular weights in a pre-defined range of greater than or equal to 16 kDa and less than or equal to 29 kDa. Further, in one or more embodiments, the HEMA end-capped polyurethanes 102 can act as macro crosslinkers in radical polymerizations.

To exemplify one or more features of the polymerization scheme 100 depicted in FIG. 9, a tailored PCL macro diol 116, PCL2800, was prepared by ROP in flow from 1,8-octanediol (e.g., the initiator in the initiator/catalyst solution 704) and ε-CL (e.g., monomer 702). Small and/or large-scale polyaddition reactions were catalyzed by 5 mol-% DBU and showed a robust and reliable behavior with residence times ranging, for example, between 210 and 300 s, which resulted in monomer conversions averaging 98.5%. Further, monitoring via the one or more measurement devices 204 can enable the reactor control system 200 to optimize and/or control the flow rates residence time associated with the HEMA. Table 7, depicted below, depicts experimental results associated with polymerization scheme shown in FIG. 9. For example, "FlowPU6" can be a sixth example polyurethane 102 having one or more HEMA end-cap groups, "FlowPU7" can be a seventh example polyurethane 102 having one or more HEMA end-cap groups, "FlowPU8" can be an eighth example polyurethane 102 having one or more HEMA end-cap groups, "FlowPU9" can be a ninth example polyurethane 102 having one or more HEMA end-cap groups, "FlowPU10" can be a tenth example polyurethane 102 having one or more HEMA end-cap groups, and "FlowPU11" can be an eleventh example polyurethane 102 having one or more HEMA end-cap groups. Values for the molar fraction of HDO were in good agreement with theoretical values resulting in an absolute average difference of only −0.4±2.2%, and the molar amount of HEMA in total diols $x_{HEMA}$ showed a low absolute deviation of −0.9±1.4% to the theoretical value of 9.5%.

TABLE 7

Experimental results for the synthesis of polyurethanes 102 endcapped with HEMA.

| Sample | Scale (g) | Macro-diol | τ (g) | Conv. (%)$^a$ | $x_{HDO,th}$ (%) | $x_{HEMA,exp}$ (%)$^a$ | $x_{HEMA}$ (%)$^b$ | $M_{n,th}$ (kDa)$^b$ | $M_{n,exp}$ (kDa)$^c$ | $M_{n,exp}$ (kDa)$^d$ | Đ$^d$ | $T_g$ (° C.)$^e$ | $T_m$ (° C.)$^e$ |
|---|---|---|---|---|---|---|---|---|---|---|---|---|---|
| FlowPU6 | 2.7 | PEG2000 | 300 | 97 | 60 | 58 | 9.0 | 10.5 | 11.1 | 11.8 | 1.72 | — | — |
| FlowPU7 | 3.0 | PCL2000 | 300 | 98 | 60 | 56 | 8.2 | 14.0 | 16.2 | 17.5 | 1.73 | — | — |
| FlowPU8 | 16.2 | PCL2000 | 210 | 99 | 60 | 60 | 7.7 | 18.0 | 20.9 | 20.3 | 1.61 | −46 | 38 |

TABLE 7-continued

Experimental results for the synthesis of polyurethanes 102 endcapped with HEMA.

| Sample | Scale (g) | Macro-diol | τ (g) | Conv. (%)[a] | $x_{HDO,th}$ (%) | $x_{HEMA,exp}$ (%)[a] | $x_{HEMA}$ (%)[b] | $M_{n,th}$ (kDa)[b] | $M_{n,exp}$ (kDa)[c] | $M_{n,exp}$ (kDa)[d] | Đ[d] | $T_g$ (°C.)[e] | $T_m$ (°C.)[e] |
|---|---|---|---|---|---|---|---|---|---|---|---|---|---|
| FlowPU9 | 15.2 | PCL2000 | 210 | 99 | 80 | 81 | 7.3 | 11.7 | 13.7 | 23.7 | 1.75 | −43 | [f] |
| FlowPU10 | 11.9 | PCL2800 | 240 | 99 | 60 | 63 | 10.4 | 21.2 | 18.8 | 30.5 | 1.66 | −46 | 39 |
| FlowPU11 | 14.9 | PEG2000 | 300 | 99 | 60 | 60 | 7.3 | 16.5 | 19.8 | 15.8 | 1.85 | −44 | 39 |

[a]Calculated from ¹H MMR.
[b]Determine with $x_{HEMA,th}$ = 0.0952 and $M_{ru}$ calculated with $x_{HDO,th}$.
[c]Determined with experimental $x_{HEMA}$ and $M_{ru}$ calculated with $x_{HDO,exp}$.
[d]Determined by GPC vs PS standard.
[e]Determined by DSC.
[f]Not observed.

As shown in Table 7, the determined molecular weights were consistent with the theoretical values considering the observed conversion. Differences between theoretical and experimental values for $x_{HDO}$ and $x_{HEMA}$ can cause small deviations in the average 1.1 kDa (8.2%). In one or more embodiments, polyurethanes 102 FlowPU8-11 can be formulated with azobisisobutyronitrile ("AIBN"), casted into discs and thermally cross-linked in neat. Likewise, in THF FlowPU9 can be formulated with butyl methacrylate in a weight ratio of 3:1 and thermally crosslinked by 5 wt % AIBN. The obtained gels can be insoluble in THF.

In various embodiments, the theoretical molar fraction of HEMA in total diols $x_{HEMA,th}$ can be calculated in accordance with Equation 12. Further, its relation to the molar fraction of HEMA hydroxyl groups in total hydroxyl groups $x_{OH,HEMA}$ can be expressed in accordance with Equation 13.

$$x_{HEMA,th} = \frac{n_{HEMA}}{n_{MDI} + \frac{n_{HEMA}}{2}} \quad (12)$$

$$x_{HEMA,th} = \frac{2x_{OH,HEMA}}{x_{OH,HEMA} + 1} \quad (13)$$

The molar fraction of HEMA in the polymer $x_{HEMA,exp}$ can be determined from the ¹H NMR spectrum of the purified product by integrating the areas corresponding to the peaks of the methylene groups of from the diol moieties and HEMA attached to the urethane linkage. In embodiments in which the chemical reactants comprise PEG, HDO and HEMA, $x_{HEMA,exp}$ can be calculated in accordance with Equation 14.

$$x_{HEMA,exp} = \frac{A_{HEMA,-CH_2-CH_2-OCONH-}}{A_{PEG,-CH_2-OCONH-} + A_{HDO,-CH_2-OCONH-} + A_{HEMA,-CH_2-CH_2-OCONH-}} \quad (14)$$

Where "$A_{HEMA,-CH_2-CH_2-OCONH-}$" can be centered at 4.32 ppm, "$A_{HDO,-CH_2-OCONH-}$" can be at 4.03 ppm, and "$A_{PEG,-CH_2-OCONH-}$" can be at 4.16 ppm. For polymers containing PCL signals of the polymeric PCL and HDO-based methylene groups next to the urethane unit overlap in the ¹H NMR spectrum; therefore, $x_{HEMA}$ can be calculated in accordance with Equation 15. Where "$A_{PCL+HDO,-CH_2-OCONH-}$" can be located at 4.03 ppm, and "$A_{HEMA,-CH_2-CH_2-OCONH-}$" can be at 4.32 ppm.

$$x_{HEMA,exp} = \frac{A_{HEMA,-CH_2-CH_2-OCONH-}}{A_{PCL+HDO,-CH_2-OCONH-} + A_{HEMA,-CH_2-CH_2-OCONH-}} \quad (15)$$

According to Carothers' equation the number-average degree of polymerization $\overline{X}_n$ for step-growth polymerizations of bifunctional monomers A-A and B-B is directly related to the extent of the reaction and the stoichiometry between the functional groups in accordance with Equation 16.

$$\overline{X}_n = \frac{1+r}{1+r-2rp} \quad (16)$$

Where "p" can be the extent of the reaction, and "r" can be the stoichiometric imbalance calculated by the ratio of total underrepresented functional groups (A) $N_A$ to total functional groups present in an excess (B) $N_B$.

Incorporating a monofunctional compound B while maintaining a stoichiometric imbalance of 1 (e.g. 1 mol A-A, 0.95 mol B-B, 0.1 mol B) can limit $\overline{X}_n$ even though the conversion of the reaction reaches completeness. In this case, the degree of polymerization can be additionally dependent on average functionality of monomers in the system ($f_{avg}$) defined in accordance with Equation 17.

$$f_{avg} = \frac{\sum N_i f_i}{\sum N_i} \quad (17)$$

Where "$N_i$" can be the amount of monomer "i" with functionality "$f_i$". Considering p, $\overline{X}_n$ can then be calculated in accordance with Equation 18.

$$\overline{X}_n = \frac{2}{2 - pf_{avg}} \quad (18)$$

With "$\overline{X}_n$" and the molecular weight of the repeating unit "$M_{ru}$", the number-average molecular weight $\overline{M}_n$ can be accessible in accordance with Equation 19.

$$\overline{M}_n = \frac{\overline{X}_n \cdot M_{ru}}{2} \quad (19)$$

Where "$M_{ru}$" can be calculated by the feed ratio-adjusted average of the molecular weights of the monomers. In various embodiments, HEMA can be used as monofunctional alcohol to decrease $f_{avg}$ below 2 and, thus, to limit $\overline{M}_n$. Equations 17-19 can be rewritten in accordance with Equations 20-23.

$$f_{avg}(x_{HEMA}) = \frac{2 - x_{HEMA}}{1 - \frac{x_{HEMA}}{4}} \quad (20)$$

$$\overline{X}_n(x_{HEMA}, p) = \frac{4 - x_{HEMA}}{2p(x_{HEMA} - 2) - x_{HEMA} + 4} \quad (21)$$

$$\lim_{p \to 1} \overline{X}_n(x_{HEMA}, p) = \frac{4 - x_{HEMA}}{x_{HEMA}} \quad (22)$$

$$\overline{M}_n(x_{HEMA}, p) = \frac{M_{ru}(4 - x_{HEMA})}{4p(x_{HEMA} - 2) - 2x_{HEMA} + 8} \quad (23)$$

$$\lim_{p \to 1} \overline{M}_n(x_{HEMA}, p) = \frac{M_{ru}(4 - x_{HEMA})}{2x_{HEMA}} \quad (24)$$

With Equation 14 results the following relationship between $\overline{M}_n$ and the molar fraction of HEMA hydroxyl groups in total hydroxy groups in the system, expressed by Equations 25-26.

$$\overline{M}_n(x_{OH,HEMA}, p) = \frac{M_{ru}(x_{OH,HEMA} + 2)}{2x_{OH,HEMA} - 4p + 4} \quad (25)$$

$$\lim_{p \to 1} \overline{M}_n(x_{OH,HEMA}, p) = \frac{M_{ru}(x_{OH,HEMA} + 2)}{2x_{OH,HEMA}} \quad (26)$$

If the polyaddition is executed to quantitative monomer conversion Equations 25 and 27 can enable a direct estimate of the limit of $\overline{M}_n$ with $x_{HEMA}$ or $x_{OH,HEMA}$, respectively.

In one or more embodiments, a solution of containing the low molecular weight diol 114, the macro diol 116, and HEMA can be introduced to the one or more flow reactors 104 via a common inlet 106 (e.g., first inlet 106a). For example, in a N$_2$-filled glovebox, a solution of PEG2000: HDO or PCL2000:HDO (40:60) and HEMA with a total of 4.99 mmol hydroxyl groups of which 5 mol-% were represented by HEMA can be prepared by dissolving 1905 mg (0.95 mmol, 0.38 eq.) of PEG2000 or 2156 mg (0.95 mmol, 0.38 eq.) of PCL2000, 168 mg (1.42 mmol, 0.57 eq.) of HDO and 33 mg (0.25 mmol, 0.10 eq.) of HEMA in anhydrous THF to a total volume of 5.5 mL. Further, a solution of diisocyanate monomer 118 can be introduced into the flow reactor 104 via another inlet 106 (e.g., second inlet 106b). For example, a 1.92 M MDI solution can be prepared by dissolving 625 mg (2.50 mmol, 1.00 eq.) of MDI in anhydrous THF to a total volume of 1.3 mL.

Additionally, a solution of catalyst 120 can be introduced into the one or more flow reactors 104 via another inlet (e.g., third inlet 106c). For example, a 9.6·10$^{-2}$ M DBU solution can be prepared by dissolving 19.0 mg (0.13 mmol, 0.05 eq.) in 1.3 mL of anhydrous THF. The retention times can be set to, for example, 120 s, 180 s, 240 s, and 300 s by varying the flow rate of each component. For example, Table 8, presented below, can depict synthesis reaction conditions associated with the example solutions and retention times described above.

TABLE 8

Retention time and flow rates for the preparation of polyurethanes 102 under control of molecular weight by end-capping with HEMA.

| τ (s) | Total (μL/min) | MDI (μL/min) | DBU (μL/min) | Macro-diol:HDO: HEMA (μL/min) | NCO groups (mmol/min) | OH groups (mmol/min) |
|---|---|---|---|---|---|---|
| 120 | 392.3 | 65.4 | 65.4 | 261.8 | 1.3·10$^{-1}$ | 1.3·10$^{-1}$ |
| 180 | 261.8 | 43.6 | 43.6 | 174.5 | 8.4·10$^{-2}$ | 8.4·10$^{-2}$ |
| 240 | 196.3 | 32.7 | 32.7 | 130.9 | 6.3·10$^{-2}$ | 6.3·10$^{-2}$ |
| 300 | 157.1 | 26.2 | 26.2 | 104.7 | 5.0·10$^{-2}$ | 5.0·10$^{-2}$ |

Figure 10:
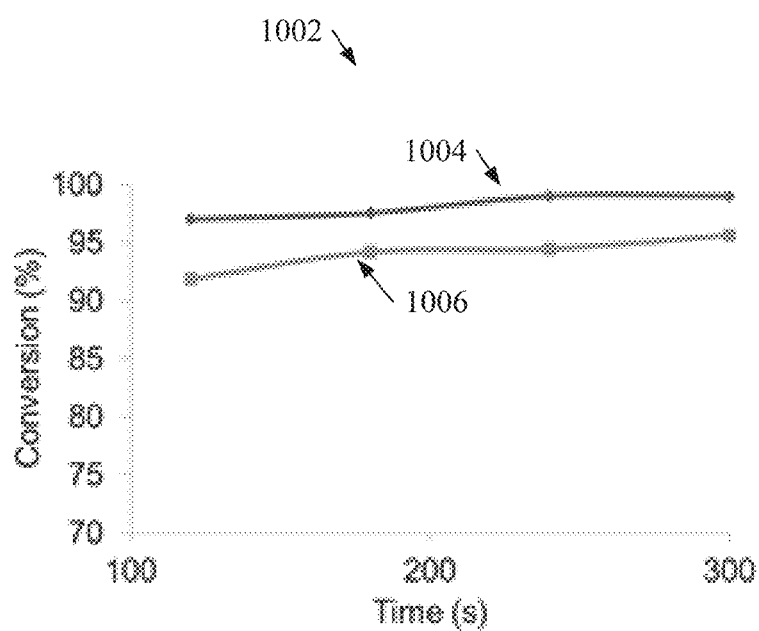
FIG. 10 illustrates a diagram of an example, non-limiting graph depicting the chemical reactant conversion associated with one or more polymerization schemes for the synthesis of HEMA end-capped polyurethane within one or more flow reactors in accordance with one or more embodiments described herein.

The reactions characterized in Table 8 were run for 1.5-fold the residence time before collecting product fractions. After every reaction, the one or more flow reactors 104 can be purged with anhydrous THF. The crude samples can be precipitated in petroleum ether, dried under reduced pressure and analyzed by $^1$H NMR and GPC. The sample prepared at a residence time of 300 s was re-dissolved in THF and precipitated twice in MeOH containing 4 vol-% TFA. After filtration and drying under reduced pressure, the product was obtained as white solid and further characterized by $^1$H NMR, FTIR and GPC. FIG. 10 illustrates a diagram of an example, non-limiting graph 1002 that can depict monomer conversion as a function of residence time for the synthesis of example HEMA end-capped polyurethanes 102: FlowPU6 and FlowPU7. Line 1004 can represent FlowPU7, where PCL2000 was employed as the macro diol 116. Line 1006 can represent FlowPU6, where PEG2000 was employed as the macro diol 116.

In one or more embodiments, in a N$_2$-filled glovebox, a solution of macro diol 116, HDO (e.g., as the low molecular weight diol 114), and HEMA can be prepared with HEMA taking up 5 mol-% of the total alcohol groups in accordance with Table 9 below. Further, all components can be dissolved in anhydrous THF. Also, a 1.92 M solution of MDI and a solution of 5 mol-% DBU can be prepared similarly.

TABLE 9

Residence time and flow rates for the preparation of polyurethanes 102 under Control of molecular weight by end-capping with HEMA

| ID | Macro Diol 116 | MDI | m [mg], DBU | n [mmol], HEMA | V$_{total}$ [ml]$^a$ Macro Diol 116 | HDO | HDO:Macro Diol 116 | τ (s) |
|---|---|---|---|---|---|---|---|---|
| FlowPU8 | PCL2000 | 3400, 13.6, 7.0, 4800, | 103, 0.68, 7.0, 146, | 177, 1.36, 28.3, 130, | 11730, 5.16, 28.3, 8280, | 915, 7.74, 28.3, 1723, | | 60:40 | 210 |

TABLE 9-continued

Residence time and flow rates for the preparation of polyurethanes 102 under Control of molecular weight by end-capping with HEMA

| ID | Macro Diol 116 | MDI | m [mg], DBU | n [mmol], HEMA | $V_{total}$ [ml][a] Macro Diol 116 | HDO | HDO:Macro Diol 116 | τ (s) |
|---|---|---|---|---|---|---|---|---|
| FlowPU9 | PCL2000 | 19.2, 10.0, 2115, | 0.96, 10.0, 64, | 1.92, 42.0, 110, | 3.64, 42.0, 9073, | 14.6, 42.0, 569, | 80:20 | 210 |
| FlowPU10 | PCL2000 | 8.45, 4.4, 3400, | 0.42, 4.04, 103, | 0.85, 17.6, 177, | 3.21, 17.6, 10362, | 4.82, 17.6, 915, | 60:40 | 240 |
| FlowPU11 | PEG2000 | 13.6, 7.0 | 0.68, 7.0 | 1.36, 28.3 | 5.16, 28.3 | 7.74, 28.3 | 60:40 | 300 |

[a]Total volume using anhydrous THF as solvent.

The initial residence time was set to 210 seconds (e.g., total flow rate of 224.3 μl/min) and the reactant conversion was determined by via the one or more measurement devices 204 in accordance with various embodiments described herein. If the reactant conversion did not reach completeness the residence time was stepwise increased by 30 s (e.g., individual flow rates can be derived from Table 8). The flow reactor 104 output can be directly precipitated in petroleum ether and dried under reduced pressure. The crude sample can be dissolved in THF and precipitated twice in MeOH containing 4 vol-% TFA. White solids can be obtained after filtration and drying the materials under reduced pressure. The products were characterized by $^1$H NMR, $^{13}$C NMR, FTIR, GPC, and/or DSC. Further, Table 10, presented below, can depict additional experimental data for the example HEMA end-capped polyurethane 102 syntheses described herein.

TABLE 10

Experimental data for polyurethane 102 syntheses using continuous flow reactors and applying end-capping with HEMA for control over molecolar weight.

| ID | Conversion (%)[a] | $x_{HDO}$ (%)[a] | $x_{HEMA}$ (%)[a] | Theoretical $M_n$ (kg/mol)[b] | Experimental $M_n$ (kg/mol)[c] | Đ[c] |
|---|---|---|---|---|---|---|
| FlowPU8 | >99 | 60 | 4.0 | 24.5 | 18 | 14 |
| FlawPU9 | >99 | 81 | 3.8 | 16.0 | 23 | 1.7 |
| FlowPU10 | >99 | 63 | 5.5 | 28.8 | 33 | 1.5 |
| FlowPU11 | >99 | 60 | 3.8 | 22.4 | 18 | 1.6 |

[a]Measured by $^1$H NMR.
[b]According to equation S13.
[c]Determined by GPC.

In one or more embodiments, the HEMA end-capped polyurethanes 102 can be further dissolved with AIBN to achieve cross-linking. For example, in a 25 mL glass vial, 2.00 g of polyurethane 102 examples FlowPU8-FlowPU11 and 30 mg of AIBN (1.5 weight-%) can be dissolved at room temperature in the minimum amount of THF, and the solution can be transferred into PTFE dishes with a diameter of 5 cm. After the solvent was removed under reduced pressure, the sample can be heated to 80° C. under protective atmosphere and the cured for 4 hours. In another example, 712.5 mg of the polyurethane 102 example FlowPU9 (71 wt %) and 237.5 mg of butyl acrylate (BuAcr, 24 wt %) can be dissolved in the minimum amount of THF (~2 mL). Upon adding 50 mg of AIBN (5 wt %) the mixture can be heated to 80° C. for 1 hour. Afterwards the reaction mixture can be cooled to room temperature and the obtained gel was washed and dried in vacuum.

Figure 11:
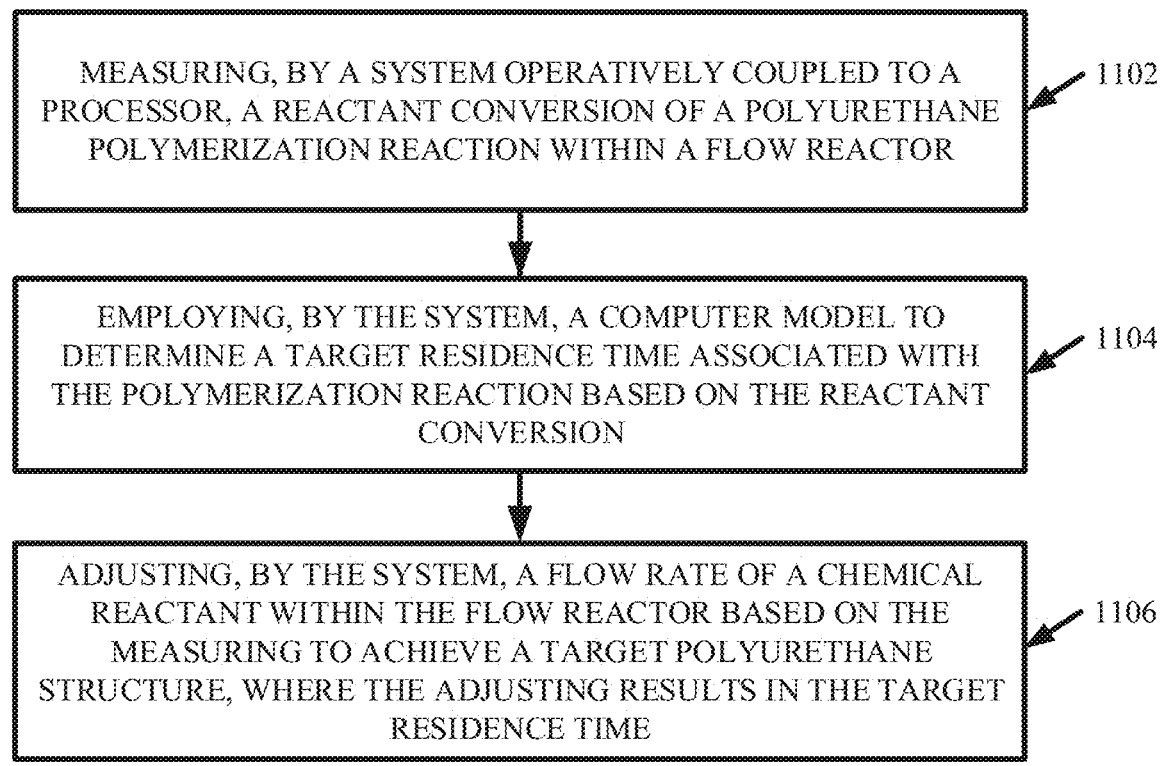
FIG. 11 illustrates a flow diagram of an example, non-limiting computer-implemented method that can be employed by one or more reactor control systems in accordance with one or more embodiments described herein.

FIG. 11 illustrates a flow diagram of an example, non-limiting computer-implemented method 1100 that can be employed by the reactor control system 200 in accordance with one or more embodiments described herein. Repetitive description of like elements employed in other embodiments described herein is omitted for sake of brevity.

At 1102, the computer-implemented method 1100 can comprise measuring (e.g., via one or more measurement devices 204), by a system (e.g., reactor control system 200) operatively coupled to a processor (e.g., comprised within the one or more computing devices 208), a reactant conversion of a polyurethane polymerization reaction (e.g., in accordance with polymerization scheme 100) within one or more flow reactors 104. For example, the polyurethane polymerization reaction can include the polymerization of one or more low molecular diols 114, macro diols 116, diisocyanate monomer 118, and/or organic catalyst 120 in accordance with polymerization scheme 100 (e.g., as illustrated in FIGS. 1-2 and/or 7-8). Additionally, in one or more embodiments, the polymerization reaction can further include end-capping the resulting polyurethane 102 with HEMA (e.g., as illustrated in FIG. 9). The measuring at 1102 can be performed by one or more measurement devices 204 that can be positioned adjacent to one or more channels 108 of the flow reactor 104 and/or can be in fluid communication with the flow reactor 104. In various embodiments, the reactant conversion can be measured via an analysis technique including, but not limited to: FTIR spectroscopy, NMR spectroscopy, UV-Vis NIR absorption, inline viscometry, refractive index, gas chromatography, a combination thereof, and/or the like.

At 1104, the computer-implemented method 1100 can comprise employing (e.g., via computing device 208), by the system, one or more computer models to determine a target residence time associated with the polymerization reaction based on the reactant conversion. For example, employing the one or more computer models at 1104 can be performed in accordance with control scheme 500 and/or 600.

At 1106, the computer-implemented method 1100 can comprise adjusting (e.g., via one or more PID controllers 202), by the system, a flow rate of a chemical reactant within the flow reactor 104 based on the measuring at 1102 to achieve a target polyurethane 102 structure, where the adjusting at 1106 can result in the target residence time determined at 1104. For example, one or more PID controllers 202 can operate one or more inlets 106 of the flow reactor 104 to adjust the flow rate to achieve the target residence time determined via the one or more computer models. For instance, the one or more PID controllers 202 can control one or more pumps of the one or more inlets 106.

In another instance, the one or more PID controllers 202 can control a duration in which one or more of the inlets 106 are in an open or closed state. In various embodiments, the flow rate adjusted at 1106 can be: the flow rate of low molecular diols 114, the flow rate of macro diols 116, the flow rate of diisocyanate monomer 118, the flow rate of catalyst 120, the flow rate of HEMA, a combination thereof, and/or the like.

Additionally, in various embodiments, one or more chemical reactants of the polyurethane polymerization reaction can be synthesized within the one or more flow reactors 104. Further, the computer-implemented method 1100 can further control the reactant synthesis reaction. For example, the computer-implemented method 1100 can measure (e.g., via second measurement device 204b), by the system, a reactant conversion of the reactant synthesis reaction within the flow reactor 104. Also, the computer-implemented method 1100 can comprise employing (e.g., via the one or more computing devices 208), by the system, one or more computer models to determine a target residence time associated with the reactant synthesis reaction based on the reactant conversion. Moreover, the computer-implemented method 1100 can comprise adjusting (e.g., via the one or more PID controllers 202), by the system, a flow rate of one or more second chemical reactants within the flow reactor 104. For example, the reactant synthesis reaction can synthesize one or more macro diols 116 employed in the polyurethane polymerization reaction (e.g., as illustrated in FIGS. 7-8).

Figure 12:
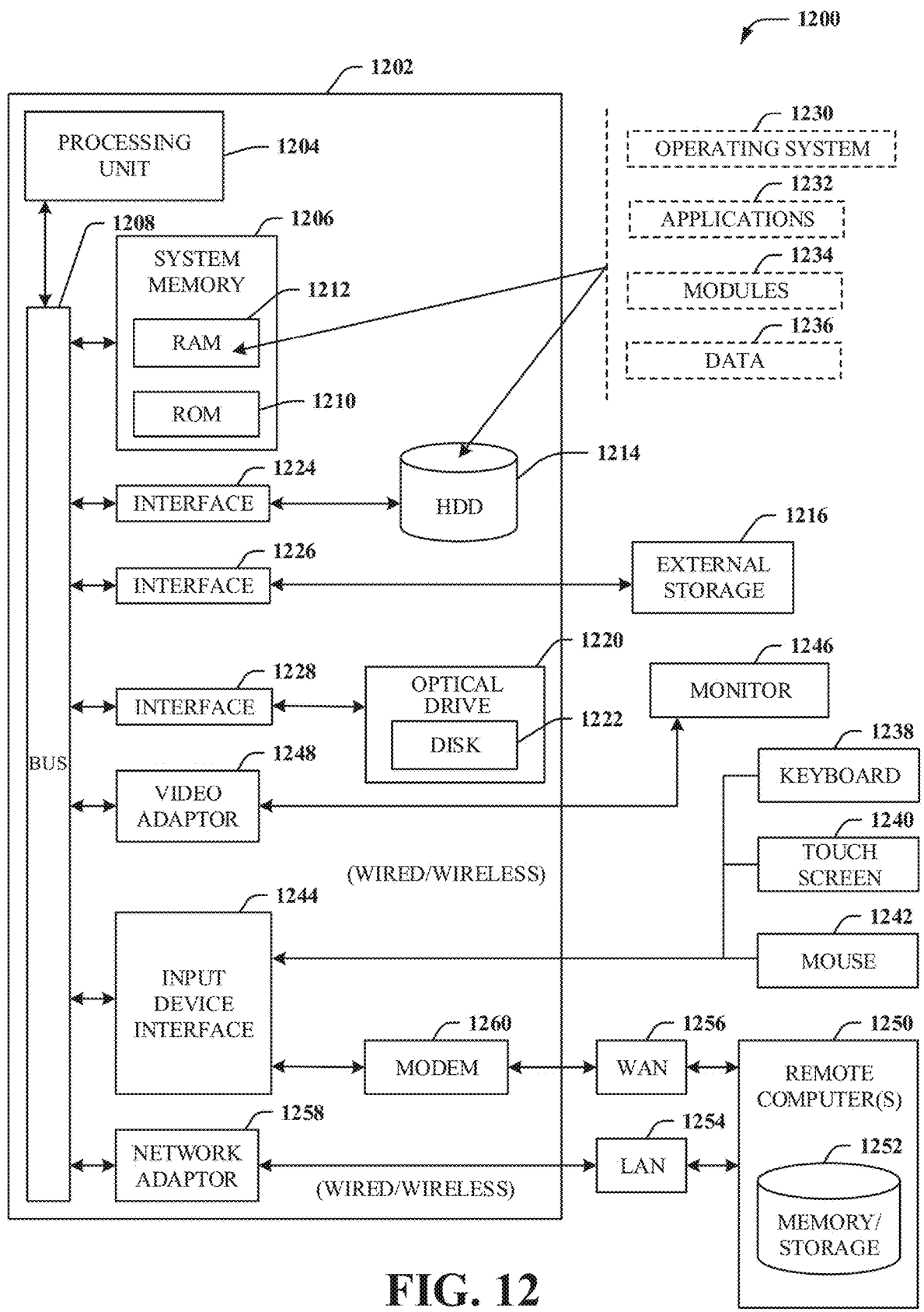
FIG. 12 illustrates a block diagram of an example, non-limiting operating environment in which one or more embodiments described herein can be facilitated.

In order to provide additional context for various embodiments described herein, FIG. 12 and the following discussion are intended to provide a general description of a suitable computing environment 1200 in which the various embodiments of the one or more computing devices 208 described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, and/or the like, that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system ("BIOS") can be stored in a non-volatile memory such as ROM, erasable programmable read only memory ("EPROM"), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive ("HDD") 1214 (e.g., EIDE, SATA), one or more external storage devices 1216 (e.g., a magnetic floppy disk drive ("FDD") 1216, a memory stick or flash drive reader, a memory card reader, a combination thereof, and/or the like) and an optical disk drive 1220 (e.g., which can read or write from a CD-ROM disc, a DVD, a BD, and/or the like). While the internal HDD 1214 is illustrated as located within the computer 1202, the internal HDD 1214 can also be configured for external use in a suitable chassis (not shown). Additionally, while not shown in environment 1200, a solid state drive ("SSD") could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine ("VM") of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1202, e.g., applied at the application execution level or at the operating system ("OS") kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, and/or the like.

A monitor 1246 or other type of display device can be also connected to the system bus 1208 via an interface, such as a video adapter 1248. In addition to the monitor 1246, a computer typically includes other peripheral output devices (not shown), such as speakers, printers, a combination thereof, and/or the like.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network ("LAN") 1254 and/or larger networks, e.g., a wide area network ("WAN") 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point ("AP") disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, and/or the like), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   synthesizing, via a polymerization reaction performed within a flow reactor comprising a plurality of reactor loops, a polyurethane,
   wherein the polymerization reaction polymerizes a diol with a diisocyanate monomer;
   wherein the synthesizing further comprises supplying the diol to the flow reactor through a first inlet, supplying the diisocyanate monomer to the flow reactor through a second inlet, and supplying an organic catalyst to the flow reactor through a third inlet;
   introducing anhydrous tetrahydrofuran (THF) into the flow reactor at a point downstream of one or more reactor loops of the plurality of reactor loops via a fourth inlet.

2. The method of claim 1, wherein the polymerization reaction further includes polymerizing a second diol with the diisocyanate monomer, wherein the diol has a melting temperature above ambient conditions, and wherein the second diol has a glass transition temperature below the ambient conditions.

3. The method of claim 2, wherein the diol is selected from the group consisting of 1,6-hexanediol, 1,8-octanediol, and diethylene glycol, wherein the diisocyanate monomer is selected from the group consisting of 4,4'-methylene diphenyl diisocyanate, toluene diisocyanate, hexamethylene diisocyanate and isophorone diisocyanate, wherein the polymerization reaction includes a catalyst selected from the group consisting of, 8-diazabiciclo[5.4.0]undeca-7-ene, dibutyltin dilaurate, 1,5,7-triazabicyclo[4.4.0]dec-5-ene, and yttrium (III) isopropoxide oxide, and wherein the second diol is selected from the group consisting of polyethylene glycol, polycaprolactone diol, polylactide diol, poly (carbo) siloxane diol and polyvalerolactone diol.

4. The method of claim 2, wherein the second diol is synthesized via a second polymerization reaction performed within the flow reactor.

5. The method of claim 4, wherein the second polymerization reaction is a ring-opening polymerization of a cyclic monomer in the presence of an initiator and a urea catalyst.

6. The method of claim 5, wherein the cyclic monomer is selected from the group consisting of ε-caprolactone, lactide, valerolactones, cyclic carbonates and cyclic (carbo) siloxanes, wherein the initiator is selected from the group consisting of 1,8-octanediol, 1,6-hexanediol, and diethylene glycol, and wherein the urea catalyst is selected from the group consisting of 1,3-Bis[3,5-bis(trifluoromethyl) phenyl] urea, 1-[3,5-Bis (trifluoromethyl) phenyl]-3-[4-(trifluoromethyl) phenyl]urea, N-[3,5-bis (trifluoromethyl)-phenyl]-N'-phenylurea, N-[3,5-bis(trifluoromethyl)phenyl]-N'-cyclohexylurea, 1-phenyl-3-(3-(trifluoromethyl) phenyl) urea, 1,3-Diphenylurea, 1-cyclohexyl-3-phenylurea, and the respective thioureas.

7. The method of claim 1, wherein the polymerization reaction further includes polymerizing the diol and the diisocyanate monomer with 2-hydroxyethyl methacrylate, wherein an end-cap group derived from the 2-hydroxyethyl methacrylate is positioned at an end of a polymer backbone of the polyurethane as a result of the synthesizing.

8. The method of claim 1, further comprising:
   generating a reactant conversion value based on a fourier-transform infrared spectra generated by a measurement device that is in fluid communication with the flow reactor.

9. The method of claim 8, further comprising:
   employing, by a processor, a computer model to identify a target residence time associated with the polymerization reaction based on the reactant conversion value.

10. The method of claim 9, further comprising:
    modifying the synthesizing by adjusting a flow rate within the flow reactor via a proportional-integral-derivative controller based on the target residence time.

11. A computer-implemented method, comprising:
controlling, by a system operatively coupled to a processor, a set of proportional-integral derivative (PID) controllers to supply diol to a flow reactor, comprising a plurality of reactor loops, through a first inlet, the diisocyanate monomer to the flow reactor through a second inlet, and the organic catalyst to the flow reactor through a third inlet;
measuring, by the system, a reactant conversion of a polyurethane polymerization reaction within the flow reactor;
wherein the polymerization reaction polymerizes the diol with the diisocyanate monomer; and
adjusting, by the system, a flow rate of a chemical reactant within the flow reactor based on the measuring to achieve a target polyurethane structure,
wherein the adjusting the flow rate comprises introducing anhydrous tetrahydrofuran (THF) into the flow reactor at a point downstream of one or more reactor loops of the plurality of reactor loops via a fourth inlet.

12. The computer-implemented method of claim 11, further comprising:
employing, by the system, a computer model to determine a target residence time associated with the polyurethane polymerization reaction based on the reactant conversion, wherein the adjusting the flow rate results in the target residence time.

13. The computer-implemented method of claim 12, wherein the measuring the reactant conversion is performed by at least one analysis technique selected from the group consisting of fourier-transform infrared spectroscopy, nuclear magnetic resonance spectroscopy, inline viscometry, gas chromatography, and ultraviolet-visible absorption spectroscopy.

14. The computer-implemented method of claim 11, wherein the introducing is associated with a variable time delay corresponding to flow rate changes within the flow reactor, and wherein the computer-implemented method further comprises:
predicting, by the system, based on accuracy of one or more historical predictions of time delay, the variable time delay prior to occurrence of the variable time delay; and
in response to the predicting, operating, by the system, another PID controller, other than the PID controllers, controlling a fourth inlet to introduce the THF, thereby minimizing or eliminating the time delay.

* * * * *